United States Patent [19]

Slater

[11] 4,238,095
[45] Dec. 9, 1980

[54] METHOD OF AND APPARATUS FOR ANCHORING AIRSHIPS AND PROPULSION MEANS FOR AIRSHIPS

[75] Inventor: Saul I. Slater, Miami Beach, Fla.

[73] Assignee: Hov-Air-Ship, Inc., Miami Beach, Fla.

[21] Appl. No.: 877,704

[22] Filed: Feb. 14, 1978

Related U.S. Application Data

[63] Continuation-in-part of Ser. No. 809,130, Jun. 22, 1977, which is a continuation-in-part of Ser. No. 674,278, Apr. 14, 1976, Pat. No. 4,085,912, which is a continuation-in-part of Ser. No. 552,793, Feb. 25, 1975, Pat. No. 3,971,533.

[51] Int. Cl.³ .................... B64B 1/66; B64B 1/24
[52] U.S. Cl. .................... 244/115; 244/26; 244/56; 294/65.5
[58] Field of Search .................... 244/2, 24–30, 244/114–116, 110 R, 93, 127, 125, 56, 66; 294/65.5; 114/242, 249; 335/285, 286, 298, 306, 29 S

[56] References Cited

U.S. PATENT DOCUMENTS

| | | | |
|---|---|---|---|
| 1,160,552 | 11/1915 | Webber | 244/26 |
| 1,567,703 | 12/1925 | Broyles | 244/115 |
| 1,847,634 | 3/1932 | Strieffler | 244/115 |
| 1,868,976 | 7/1932 | Hall | 244/66 |
| 1,879,345 | 9/1932 | Lawrence | 244/26 |
| 2,150,428 | 3/1939 | Crum et al. | 244/115 |
| 2,386,814 | 10/1945 | Rosendahl et al. | 244/115 |
| 2,403,456 | 7/1946 | Pitciarn | 244/115 |
| 2,683,618 | 7/1954 | Long | 294/65.5 |
| 2,906,554 | 9/1959 | Sjostrom | 294/65.5 |
| 3,032,363 | 5/1962 | Clayborne | 294/65.5 |
| 3,079,191 | 2/1963 | Engelsted et al. | 294/65.5 |
| 3,096,047 | 7/1963 | Dunn, Jr. | 244/26 |
| 3,151,826 | 10/1964 | Michel | 244/115 |
| 4,030,441 | 6/1977 | Nagata et al. | 114/242 |

FOREIGN PATENT DOCUMENTS 228277 1/1909 Fed. Rep. of Germany ........... 244/115
2057287 3/1972 Fed. Rep. of Germany ............ 244/93

*Primary Examiner*—Galen Barefoot

[57] ABSTRACT

A method of and apparatus for anchoring an airship containing lighter-than-air gas includes positioning one or more magnets, flush with the edges of a support member attached to the airship for enabling the magnet to contact a magnetically attractive anchoring structure affixed to the ground when anchoring is desired, and, when ascent is desired, bearing against the anchoring structure with the support member to separate the magnet from the anchoring structure. The support structure may comprise a hollow shaft attached to a downwardly-facing portion of the airship, with a relatively large area base portion at its other end, having a cavity formed in the bottom of the base portion in communication with the hollow portion of the shaft. The magnet is coupled to a lifting device which bears against the top end of the shaft to control the magnet's position in the cavity. Alternatively, circularly arranged magnets can be coupled to a downwardly-facing airship portion and a shaft-like member located centrally of the magnets can be moved in directions perpendicular to the surface of the magnets. The support structure may, instead, be a cylinder-like structure mounted to a forward-facing portion of the airship, with a motor device coupled to one end of the cylinder-like structure for moving the magnet relative to the other end thereof, and the anchoring structure includes magnetically attractive member rotatably mountd to a mast-like structure secured to the ground. The airship's propulsion assembly may include at least one pair of reversible pitch propellers, each pair operable by a single drive motor, with the direction of their thrust variable through at least about 90° and preferably about 180°.

24 Claims, 45 Drawing Figures

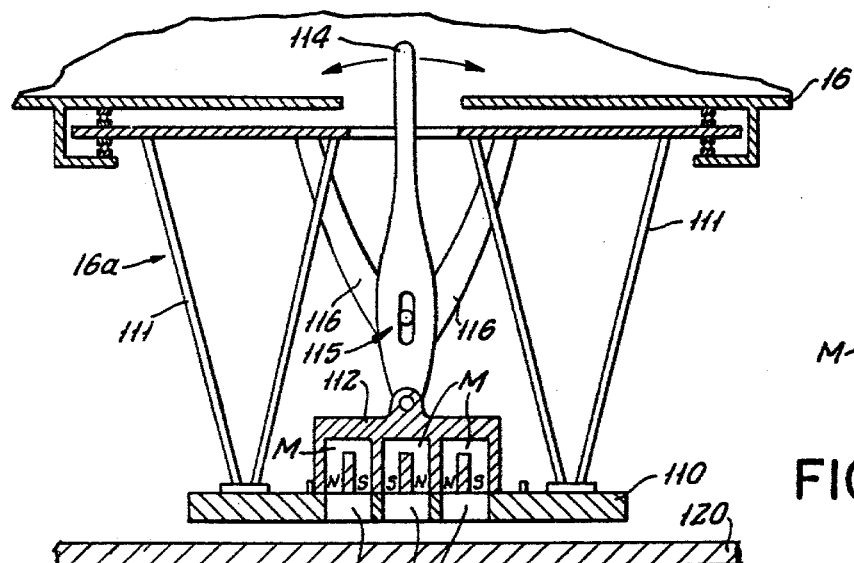
FIG. 24
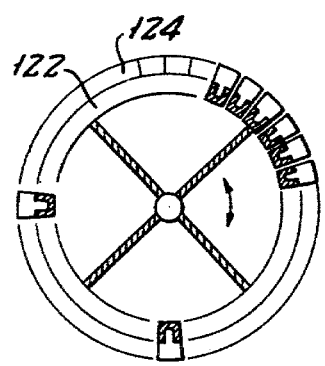
FIG. 28
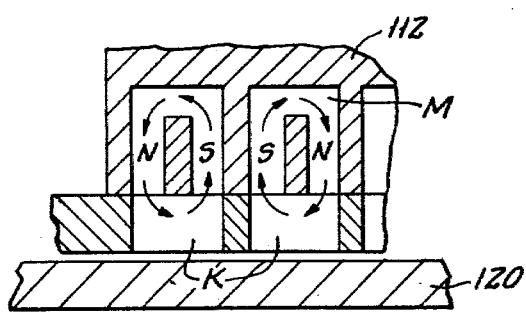
FIG. 25a
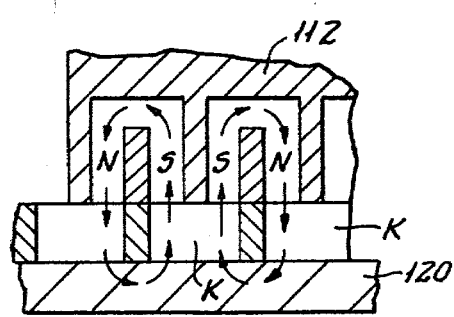
FIG. 25b
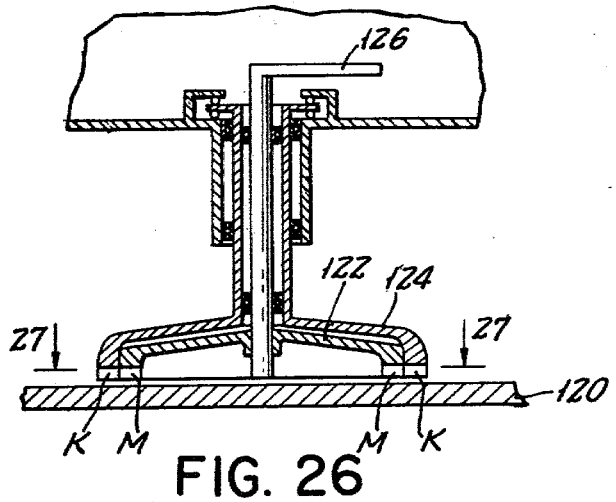
FIG. 26
FIG. 27

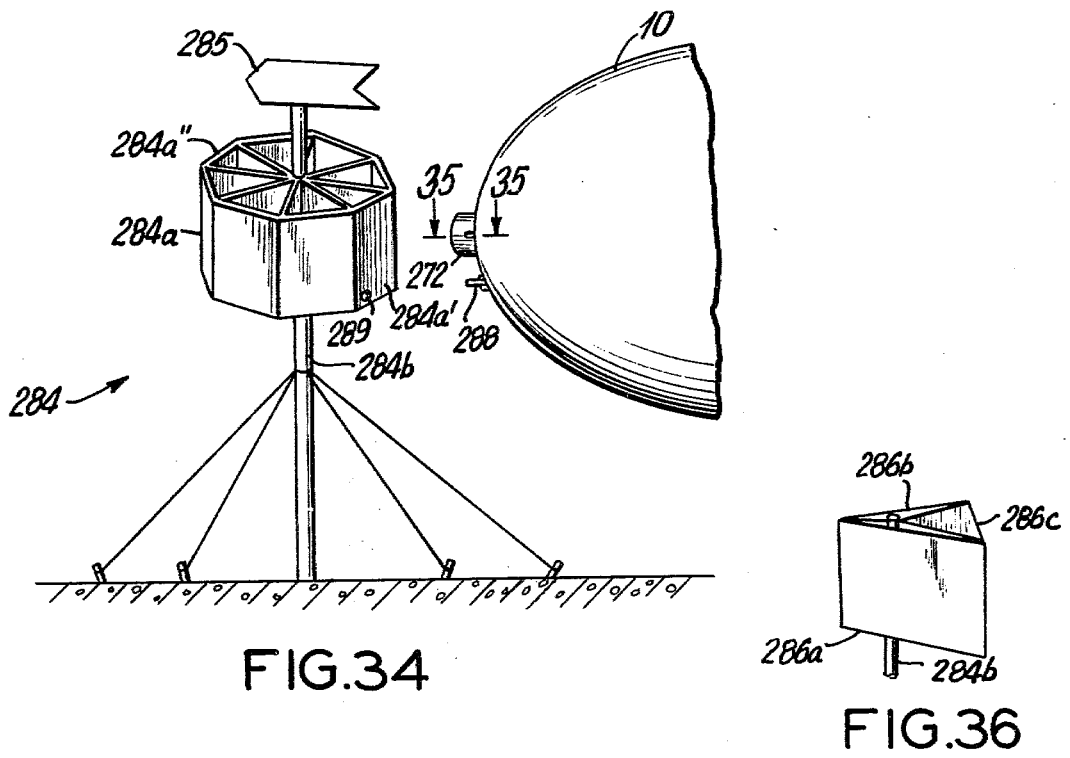
FIG.34
FIG.36
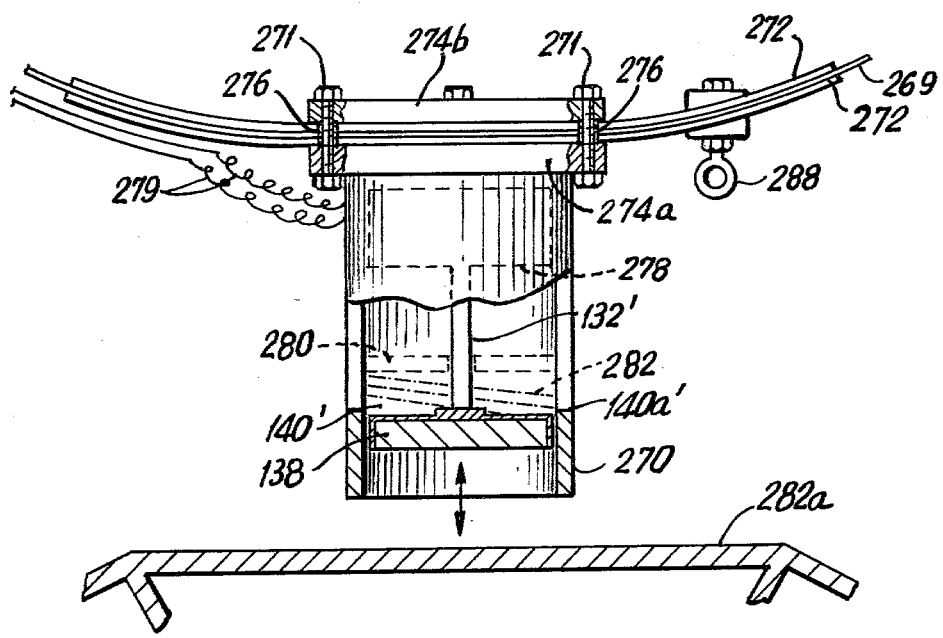
FIG.35

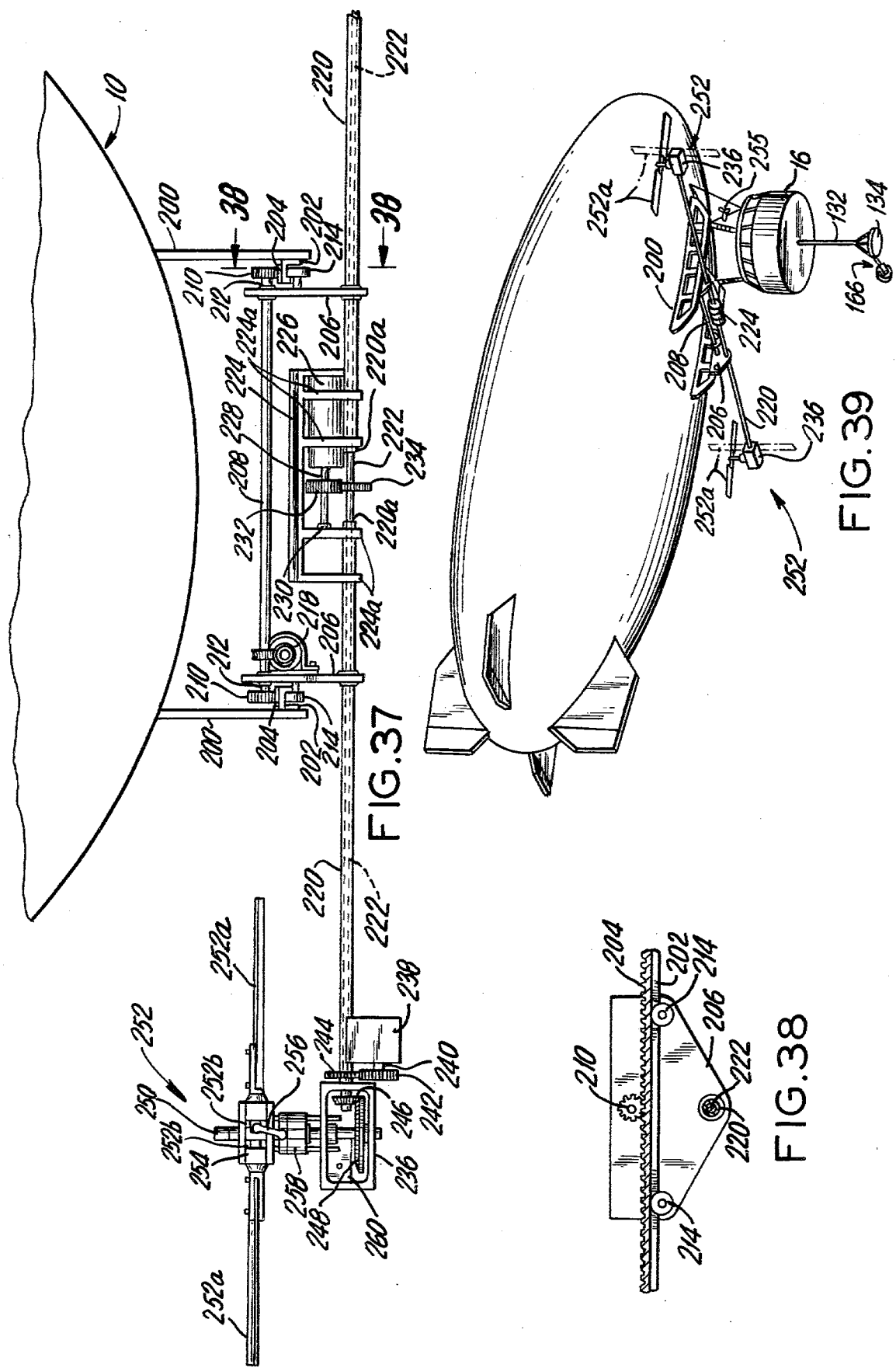

METHOD OF AND APPARATUS FOR ANCHORING AIRSHIPS AND PROPULSION MEANS FOR AIRSHIPS

CROSS REFERENCE TO RELATED APPLICATIONS

This application is a continuation-in-part of my co-pending application Ser. No. 809,130 filed June 22, 1977, which is a continuation-in-part of my co-pending application Ser. No. 674,278 filed Apr. 14, 1976 (now U.S. Pat. No. 4,085,912), which was a continuation-in-part of my then co-pending application Ser. No. 552,793 filed Feb. 25, 1975 (now U.S. Pat. No. 3,971,533, granted July 27, 1976).

BACKGROUND AND OBJECTS OF THE INVENTION

The present invention relates generally to airships containing lighter-than-air gas (hereinafter simply referred to as an "airship") and, more particularly, to a method of and apparatus for landing and anchoring such airships, including a method of and apparatus for propelling same.

Balloons, blimps and zepplins have captured the fancy of man since he first aspired to fly. These airships combine desirable characteristics from the standpoint of aerodynamics travel economy and ecology. Lighter-than-air vehicles can remain aloft indefinitely and are capable of touching down in areas which would be inaccessible for most other conventional transport vehicles. They can be powered by a simple propeller engine and refueling can be accomplished either directly from the ground or by means of a simple umbilical cord from another aircraft.

Airships containing lighter-than-air gas provide inexpensive and environmentally inoffensive means of transporting people or cargo. Unfortunately, rigid frame zepplins are virtually obsolete and, among currently utilized airships, blimps have been relegated to use for advertising and promotional campaigns while balloons find frequent use by fanciful dare-devils in attempted uncontrolled—and usually unsuccessful—record free-air flights.

People have been reticent since the later 1930's to pursue flight by lighter-than-air vessels, after the "Hindenburg" was mysteriously and spectacularly consumed by flames. However, with little modification of old designs—most notably through the use of inert helium gas rather than flammable hydrogen—the airship can be a most useful advance in the field of transportation. One disadvantage of most conventional airships is the awkwardness and expense associated with landing and anchoring them. In general, once the airships nears the ground, a large (about 10- to 25-man) ground crew is needed to "pull" the airship down to the ground by a plurality of cables which are lowered from the airship and to direct the nose of the airship into the anchoring mechanism. Thus, not only is the method of landing somewhat primitive, awkward and time-consuming, but also it involves substantial expense in the form of bulky anchoring structures, compensation for the ground crew, and a relatively lengthy landing approach area.

Moreover, the dangling cables from the airship are dangerous since they can touch high-power lines or get caught in trees and the like. Furthermore, such airships are incapable of truly vertical landing (i.e., without forward movement) unless the ground crew is pulling down the airship. In addition, the airship requires substantial land area for accommodating the landing approach for the airship, as well as for accommodating the airship, once anchored, if, as is the conventional method, the airship is to be free to swing by its nose around an anchoring structure secured to the ground. Thus, for example, with the airship moored by its nose, the circular land area required for mooring the airship has a diameter equal to about twice the length of the airship and the additional area for the approach will be even more.

One prior art patent, U.S. Pat. No. 1,567,703 issued to Broyles, discloses an anchoring assembly having an anchor which is lowered from the gondola and has electromagnets mounted therein. The anchor is suspended by a cable and winch assembly which enables the anchor to be lowered from the gondola and the airship to be pulled down by the winch once the electromagnets have magnetically engaged a suitable anchoring member on the ground. As a result of such anchoring, the airship is secured to the ground without any rotatable capability.

Although the anchoring device according to Broyles may operate satisfactorily from some applications, it does not enable rotation of the airship after it is anchored. In addition, while the airship is being "pulled down" by the cables, it would be completely at the mercy of the wind, and the cable could be chaffed during the winching operation. Moreover, any forces acting on the magnet/anchor via the cable, which are disposed in any direction other than vertical, would effectively cause a moment on the anchor, thereby tending to weaken the magnetic attraction between the magnet and the anchoring structure on the ground. Furthermore, lowering the magnet by the cables does not enable truly precision anchoring, and the cables could be twisted and snapped if the airship began rotating while being winched down. Also, it would probably be very difficult, if not impossible, for a pilot to attempt anchoring the ship while also having to control the airship simultaneously.

Although "heavy-lift" airships have been proposed for lifting heavy and/or bulky objects much like the "sky-crane" helicopter devices, conventional airships are not suitable for such applications without heavy ballast equipment. Once such airships have delivered their payload, the airship would, without the addition of substantial ballast, always tend to rise. Accordingly, there is a need for an improved airship which is capable of lifting and depositing heavy loads without requiring such additional heavy ballast equipment.

It is therefore an object of the present invention to provide new and improved anchoring means for airships containing lighter-than-air gas. Another object of the present invention is to provide new and improved propulsion means for use either alone or in conjunction with the anchoring means.

It is a further object of the present invention to provide a new and improved apparatus for landing and anchoring an airship, which enables landing and at least initial anchoring essentially by the pilot alone without the need for a ground crew or on-board help.

It is also an object of the invention to provide a new and improved airship having a simple and strong anchoring means, with the airship requiring relatively less land area than conventional techniques for approach, touchdown and anchoring.

It is yet a further object of the invention to provide an airship whose propulsion system can be located at various positions with respect to the longitudinal axis of the gas-containing structure for controlling the horizontal trim of the airship.

It is still another object of the present invention to provide new and improved propulsion means for a lighter-than-air airship, enabling the airship to lift and deposit heavy loads without requiring additional ballast equipment to enable the ship to descend after it is unloaded.

Objects and advantages of the invention are set forth in part above and in part below. In addition, these and other objects and advantages will be appreciated herefrom, or may be learned by practice with the invention, the same being realized and attained by means of the methods, apparatus and combinations pointed out in the appended claims. Accordingly, the invention resides in the novel structures, arrangements, steps and improvements herein shown and described.

SUMMARY OF THE INVENTION

Briefly described, the method of and apparatus for anchoring an airship, according to the invention, includes positioning a magnet in direct magnetic engagement with a magnetically attractive anchoring member secured to the ground, when anchoring is desired, and, when ascent of the airship is desired, bearing directly against the anchoring member to separate the magnet from the anchoring member. As preferably embodied, the magnet is slidably retained within a cavity-like portion of a support member attached to the airship, and the support member, made of a non-magnetically attractive material, is adapted to bear against the anchoring member for disengaging magnetic coupling between the magnet and the anchoring member.

According to one embodiment, the support member includes a hollow shaft member coupled at its top end to a downwardly-facing portion of the airship and having a large-area base portion at its other end. The cavity-like portion is formed in the base portion, communicating the bottom of the base portion with the hollow portion of the shaft, and lifting means are coupled between the top of the shaft and the magnet for changing the position of the magnet within the cavity-like portion. In addition, the hollow shaft may be rotatably mounted to the airship and castor-like roller means may be mounted to the base portion.

According to a modified embodiment, the support member may include a cylinder-like member attached to a forward-facing portion of the airship, having an opening defined at one end to define the cavity-like portion and motor means coupled between the other end and the magnet for positioning the magnet relative to the one end of the cylinder-like member. The anchoring member includes a magnetically attractive member rotatably mounted to a mast-like support member secured to the ground and the rotatable member is adapted to position a flat surface thereof perpendicular to the wind.

The airship may also be provided with a pair of reversible pitch propellers operated by a single drive motor, with the direction of thrust of the propellers variable through at least about 90°, and preferably 180°. In addition, the motor and propeller assembly may be mounted to a frame which is attached to the airship (preferably not the gondola), to enable the propulsion assembly to move fore and aft.

Accordingly, it will be found that the objects and advantages specifically enumerated herein are achieved by the invention as herein embodied. Thus, it will be found that airships containing lighter-than-air gas may be conveniently anchored in accordance with the present invention for improved overall utility of the airship.

It will be found that airships utilizing the anchoring and/or propulsion capabilities according to the present invention exhibit not only the recognized advantages of lighter-than-air vehicles, including efficient and low-cost operation but also enable simple and accurate landing and anchoring of the airship as well as improved maneuverability. Thus, by utilizing magnetic anchoring according to the present invention, it will be found that the airship can be anchored without the need for a ground crew to pull the airship to the anchoring site so that anchoring can be accomplished by the airship pilot alone.

In addition, by rotatably mounting the support structure to a downwardly facing portion of the airship, it will be found that the airship can "swing" around the anchoring site similar to a weather-vane to prevent the airship from being strained by gusts of wind, while anchored. Moreover, by providing a large-surface-area base portion, it will be found that the airship will remain anchored despite any moment acting on the airship, caused by wind tending to lift one end (typically, the tail).

It will also be found that by providing a cylinder-like member on a front-facing portion of the airship, with a magnet slidable therein and coupled to motor means, the airship can be "driven" towards a mounting structure for convenient touch-down and anchoring while facing into the wind. In addition, by providing an anchoring member rotatably mounted to a mast-like structure secured to the ground, which is adapted to orient a flat surface perpendicular to the wind, it will be found that the airship can utilize a flat surface magnet and a suitable magnetically attractive member will always be available for magnetic engagement with the magnet.

Also, by providing rotatable/reversible thrust propulsion means (specifically, reversible pitch propellers) for the airship, it will be found that the airship can descend to and ascend from the anchoring site in a truly VTOL manner, without requiring cables, ground crews or a long landing approach. Moreover, with the propulsion devices rotatably mounted to the airship with at least about half their air stream thrust projected, outboard of the airship envelope, a substantial portion of the air stream thrust therefrom (i.e., the updraft generated by the propulsion devices) will be directed free from interference by the airship envelope not only to prevent the risk of damaging the envelope but also to provide sufficient free-flowing thrust for propelling the airship downwardly, since any thrust pressure due to the air stream incident on the envelope tends to negate the downward "pull" of the propulsion devices. In addition, it will be found that the propulsion assembly according to the invention enables the airship to pick up a heavy load, transport it to the desired destination for deposit and return empty, if desired, without extraordinary ballast added by additional ballast equipment.

It will be understood that the foregoing general description as well as the following detailed description are exemplary and explanatory of the invention, but are not restrictive thereof. Accordingly, the accompanying drawings, referred to herein and constituting a part hereof, illustrate preferred embodiments of the invention and, together with the description, serve to explain the principles of the invention.

BRIEF DESCRIPTION OF THE DRAWINGS

FIG. 23b is a view taken along section 23b—23b of FIG. 23a.

FIG. 24 is a side view of magnetic anchoring means according to one aspect of the present invention.

FIGS. 25a and b are side views of the operative arrangements of the embodiment shown in FIG. 24.

FIG. 26 is a section side view of an alternate embodiment according to the aspect of the present invention described with respect to FIG. 24.

FIG. 27 is a view taken along section 27—27 of FIG. 26.

FIG. 28 is a section of the embodiment shown in FIG. 27 in a shifted configuration.

FIG. 34 is a side elevational view of an embodiment illustrating another anchoring assembly according to the present invention.

FIG. 35 is a sectional view taken along section 35—35 of FIG. 34.

FIG. 36 is a side elevational view showing another aspect of the embodiment shown in FIG. 34.

FIG. 37 is an elevation view of a preferred propulsion assembly according to another aspect of the present invention.

FIG. 38 is a view along section 38—38 of FIG. 37.

FIG. 39 is a perspective view of an airship having the propulsion devices shown in FIG. 37.

DETAILED DESCRIPTION OF PREFERRED EMBODIMENTS

Referring first to FIGS. 1-18, there are shown various embodiments of airships which are convertible between generally horizontal and generally vertical orientations, as well as certain embodiments of anchoring structures. These embodiments are described more fully in my co-pending application, Ser. No. 674,278, filed Apr. 14, 1976 (now U.S. Pat. No. 4,085,912) and my issued U.S. Pat. No. 3,971,533, granted July 27, 1976, both of which are hereby incorporated by reference herein. However, portions thereof will be repeated herein for clarity.

Turning then to FIGS. 19-28, there are shown various aspects of improved anchoring means for an airship, which are disclosed in my co-pending application, Ser. No. 809,130, filed June 22, 1977, and which will be repeated herein. Accordingly, the following description repeats certain portions of my previous applications and includes further description of certain improvements thereover.

As previously described in my U.S. Pat. No. 4,085,912, conventional lighter-than-air airships usually are anchored in a generally horizontal orientation with the nose (bow) of the gas envelope rotatably attached to a tall pole, as shown generally in FIG. 15. In addition, a castor may be attached to the bottom of the gondola (which is rigidly attached to the gas envelope) such that the entire airship may be freely rotatable about the pole and move under the influence of prevailing winds. Thus, a substantially large land area is required to allow such airships to rotate 360° around the swivel or pivot point to accommodate all wind conditions.

Figures 16, 17:
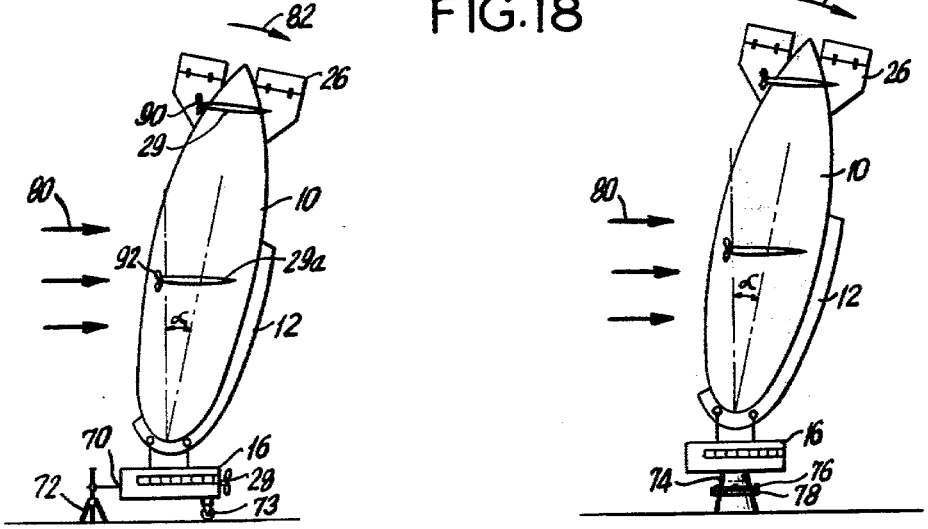
FIG. 16 is a side view of anchoring means according to the invention.
FIG. 17 is a side view of another embodiment of anchoring means according to the invention.

However, in a particularly useful embodiment of the present invention, means are provided for securely and safely anchoring the airship at a landing site of limited area. Accordingly, attachment means 70 may be provided on gondola 16, substantially at the front thereof for pivotal attachment to stanchion 72 which is firmly secured to the ground, as shown in FIG. 16. Thus, when the airship is brought into a vertical orientation for landing, as described hereinabove, the airship may be anchored to stanchion 72 on the ground by attachment means 70. Thereafter, positioning means 35 may be left slack to enable vertically extending gas envelope 10 to move or rotate (as indicated by arrow 82) through any angle α under the influence of prevailing winds (indicated by the arrows 80).

Accordingly, an airship including this feature of the present invention can be anchored to the ground so as to be substantially freely rotatable about stanchion 72, yet allowing vertical angular movement of envelope 10 with respect to gondola 16. The airship is therefore provided with sufficient "give" to yield to prevailing winds for preventing damage thereto while anchored. As here preferably embodied, roller means 73 (advantageously a castor) may be provided near or at the back end of gondola 16 to provide a second support point on gondola 16 such that the back end of the gondola can swing around stanchion 72 together with envelope 10 as a unit. Thus, stanchion 72 is shorter than currently used anchoring poles for strength and low cost.

Another preferred embodiment of anchoring means is shown in FIG. 17. According to this embodiment, the airship includes anchoring structure 74 secured to the bottom of gondola 16, generally at its mid-section or, preferably, at its center of gravity. Anchoring structure 74 is advantageously provided with mounting plate 76 adapted for secure engagement to a suitable anchor plate 78 secured to the ground. Anchoring structure 74, secured through mounting plate 76 and anchor plate 78 is rotatable with respect to gondola 16 and the ground. Accordingly, when mounting plate 76 and anchor plate 78 are coupled, the entire airship is capable of rotating or swiveling about the point to which anchor plate 78 is secured to the ground. In addition, with positioning means 35 maintained slack, the airship is provided with sufficient vertical angular yield capability to avoid being damaged by strong winds while the airship is anchored.

Advantageously, mounting plate 76 includes magnet means (described more fully hereinafter) operable from the gondola, which is capable of generating a strong attractive force to ferromagnetic (i.e., magnetically attractive) anchor plate 78. Accordingly, when the airship has descended, as described hereinbefore, the magnet may be energized to attract the airship to anchor plate 78. Thereafter, plate 76 and 78 may be clamped together by any conventional clamping means to provide secure coupling between plates 76 and 78. For ascent, the clamps are removed and the magnet de-activated, and the airship may ascend as described hereinbefore. As here preferably embodied, mounting plate 76 (which includes the magnet means) is rotatable with respect to gondola in order that the airship may be safely anchored (as discussed immediately above) to a simple steel plate secured to the ground, either as a standard procedure or during an emergency.

Advantageously, and as here preferably embodied, by utilizing propulsion devices 90 and/or 92, the axis of envelope 10 is maintained at a small angle with respect to vertical (i.e. ranges from about 5° to 15°) in order that the airship will more easily swivel around stanchion 72, or anchoring structure 78, under the influence of varying wind directions. Thus, with the pre-inclined angular orientation of envelope 10, it acts somewhat like a weather vane to accomodate changes in wind direction, thereby significantly lessening any possibility of straining the airship under such conditions.

Figure 19:
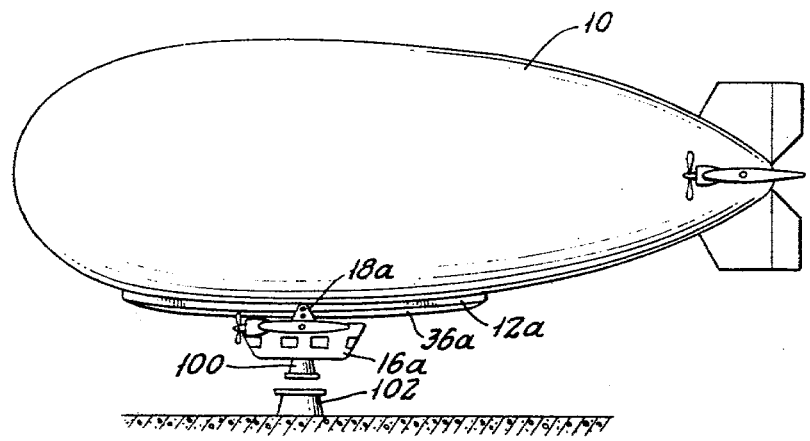
FIG. 19 is a side view illustrating apparatus for anchoring airships, according to the present invention.
Figure 20:
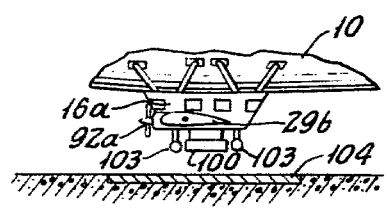
FIG. 20 is a partial side view of the apparatus shown in FIG. 19, modified in accordance with another feature of the present invention.

Referring now to FIGS. 19–20, there is illustrated a further aspect of the method and associated apparatus for landing and anchoring airships according to the present invention. According to the aspect shown in FIG. 19, the airship is preferably formed with a "short track" 12a attached to the envelope, which extends at least between the points of maximum change in location, fore and aft, of the center of dynamic and/or static balance (described more fully below) of the airship, to span at least all the points at which the center of dynamic and/or static balance of the airship may occur so that the gondola may be positioned at such center for any given loading and ballonet-loading condition, as by positioning along track 12a by attachment means 18a.

It will be understood that track 12a may be constructed essentially the same as the "long track" structures (i.e., track 12) disclosed above with respect to FIGS. 1–14 and 16–18, except that it does not extend around the nose of the airship as shown in those figures. Moreover, although gondola 16a is illustrated somewhat different than gondola 16 described above, the gondola used according to the aspects of the invention described with reference to FIGS. 19–28 may be any gondola, such as gondola 16, adapted for variable positioning. Accordingly, the airship may include convenient means for positioning gondola 16a along member 12a, such as, for example, winch 38a and cable 36a (attached to both ends of track 12a or to any other convenient points on the airship), similar to those devices described more fully hereinbefore, as well as motorized mounting means 18 illustrated in FIG. 9c or any other convenient means for translating gondola 16a along member 12a.

Turning specifically to FIG. 19, magnet means 100 is mounted to the bottom of gondola 16a and adapted to be activated for magnetically attraction to anchoring member 102, affixed to the ground. Advantageously, either member 100 or member 102 is adapted to enable rotation of gondola with respect to the ground such as described above with reference to FIG. 17; preferably, magnet means 100 is provided with the rotatable capability so that the airship will be rotatably anchorable no matter where it is anchored, as, for example, anchoring to any heavy steel plate during an emergency.

In operation, the airship is made to descend, such as by filling ballonets inside envelope 10 with air to increase the effective density of the gas within envelope 10, until it is positioned over the landing site. In addition or alternatively, the airship can be accurately positioned by utilizing the rotatably mounted propulsion means mounted thereto, so as to enable the airship to be driven towards the ground and/or to compensate for prevailing wind conditions, as needs may dictate. Furthermore, once positioned over member 102, the airship can be caused to descend closer thereto so that magnetic means 100 can be activated to bring the airship into magnetic attraction with anchoring plate 102, with the additional groundward drive provided by the propulsion devices, to enable a vertually completely vertical landing, without requiring large land areas to accommodate the forward moving landing approach needed in conventional landing and anchoring techniques.

Figure 23B:
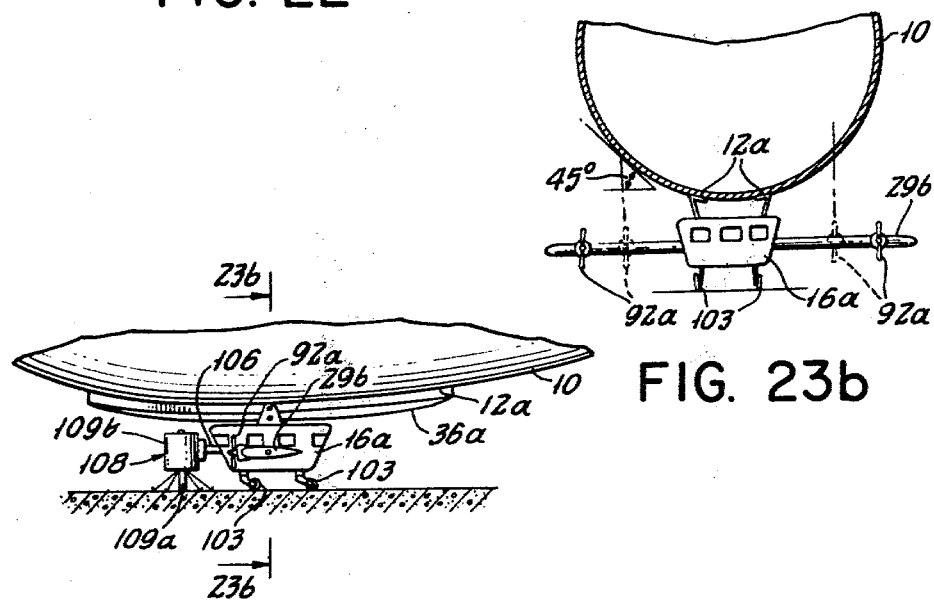
Figure 23A:
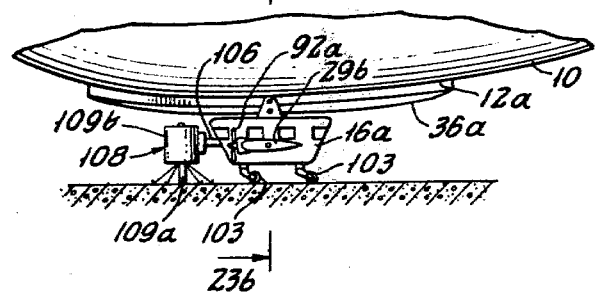
FIG. 23a is a side view of another embodiment of airship anchoring apparatus according to the present invention.

Referring to FIG. 23b there is shown a preferred embodiment of rotatably mounted propulsion devices. According to this aspect of the invention, propulsion devices 92a are rotatably mounted to the airship gondola so as to be positioned sufficiently outboard of the gondola that a substantial portion of the upward stream of air flow (i.e., the downwardly pulling thrust provided when devices 92a are oriented to provide thrust perpendicular to the airship's longitudinal axis) is projected at a portion of the airship envelope 10 having a slope of no less than about 45° (as shown in phantom in FIG. 23b). In this way, the major part of the thrust from devices 92 will not be negated by its incidence upon the flatter portions of the bottom of envelope 10 and most of the thrust which is incident on envelope 10 will be directed upwardly by the contour of the envelope. As preferably embodied, and as specifically shown in solid lines in FIG. 23b, propulsion devices 92a are located outwardly so as to be at least directly under the outermost edge of envelope 10 so that at least half the thrust therefrom is projected completely clear of envelope 10. Moreover, it is preferred that propulsion devices 92a are mounted to gondola 16a by rotatable wings 29a to provide additional lift and guidance for the airship. However, it will be understood that propulsion devices 92a can simply be mounted by any convenient support structure.

Figure 22:
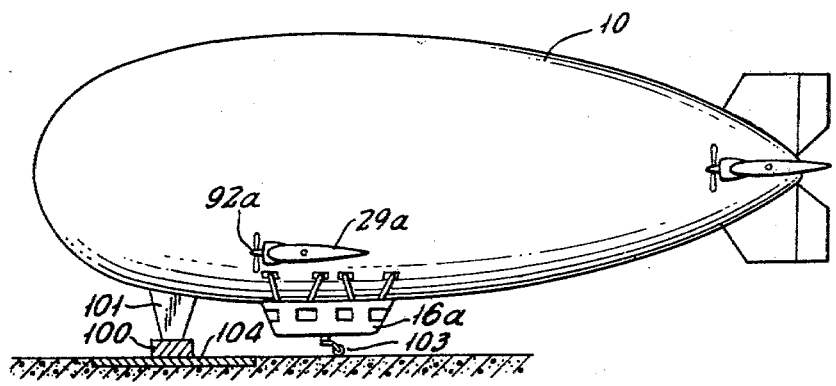
FIG. 22 is a partial side view of a variation of the aspect of the invention shown in FIG. 21.

Alternatively, devices 92a can be mounted by rotatable wings 29a mounted to envelope 10 above gondola 16a but below the longitudinal axis of the airship, as illustrated in FIG. 22. Thus, the weight of propulsion devices 92a and wings 29a will be located relatively low on the airship for stability.

Advantageously, magnetic means 100 should be strong enough, given the lift capabilities of the airship at its lightest condition (e.g., no load and little or no fuel), to maintain magnetic anchoring engagement with ground anchoring member 102 so that the airship will remain anchored despite a strong gust or updraft of wind. Once the airship is "initially anchored" by the magnetic attraction between members 102 and magnetic means 100, the airship is thence preferably mechanically anchored, as by clamping or otherwise fastening magnet 100 or a portion thereof to member 102 or to some other structure secured to the ground.

Referring specifically to FIG. 20, magnet means 100 is attached to the bottom of gondola 16a (which is shown fixedly attached to the airship envelope) along with roller means 103 which are preferably swivelling castors. Here, magnet 100 is provided with the rotatable capability and is dimensioned with its bottom surface defining a plane which generally co-incides with the plane defined by the bottom of roller means 103 so that the airship can be landed on a simple flat plate (indicated at 104) of magnetically attractive material. However, it will be understood that the proportioning of the bottom of member 100 may be adapted to accommodate any spring-like or shock-absorbing capability built into roller means 103. In this way, the pilot can simply hover generally over plate 104 and cause the airship to descend to effect mating between the magnet and the plate by activating magnet means 100.

The use of track 12a (shown in FIGS. 19 and 21) will be found particularly advantageous where convertibility of the airship's longitudinal axis between generally horizontal and generally vertical orientations, as by track 12 described above with reference to FIGS. 1–14 and 16–18, is not required. Thus, for example, track 12a will be lighter than track 12 yet will enable movement of gondola 16a so as to permit it to be variably positioned along the track, such as at the static or dynamic center of balance of the airship, or to be positioned over the anchoring member (i.e., member 102 or plate 104) attached to the ground while the remainder of the airship hovers in a generally stationary posture.

Positioning the gondola at the dynamic center of balance is particularly useful where the airship is equipped with rotatably mounted propulsion means, especially if mounted to the gondola (as by fixed attachment to rotatably mounted wings). Thus, when the airship is ascending, for example, as a result of thrust provided by propulsion devices mounted to the gondola, the air resistance over the upper surface area of the envelope structure will generally produce a center of dynamic balance which may not coincide with the static center of gravity of the airship. Therefore, the gondola can be positioned to reside directly under the center of dynamic balance so as to enhance the equilibrium of the airship during propelled ascent as well as propelled descent. Moreover, all the propulsion devices could be mounted to the gondola, as described above, to minimize the number of propulsion devices, to keep the amount of such heavy weight well below the longitudinal axis of the ship to enhance stability and to facilitate stability during propelled descent since the downwardly "pulling" thrust will be relatively concentrated at the gondola to aid in directing the airship to its landing site.

In addition, track 12a enables the gondola to be repositioned relative to the airship envelope after the airship is anchored. In this way, the point of connection between the gondola and the airship envelope can be located at the center of gravity of the airship to enable the airship to swing around the anchoring point, under the influence of prevailing wind, generally similar to a weather vane, while the anchored airship remains essentially level. It will be understood that the vertical stabilizer can be adapted to aid in the weather vane effect by providing a large-sized vertical stabilizer to ensure that the surface area aft of the anchor point is greater than that forward of the anchor point to ensure the weather vane effect. In this way, the land area required for maintaining the airship anchored can be minimized, generally as described above.

Figure 1:
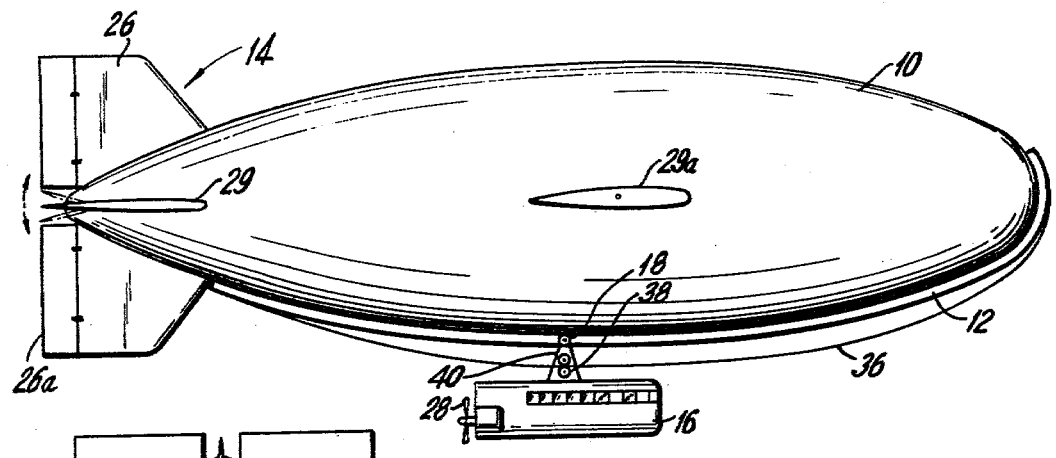
FIG. 1 is a side view of an airship according to the present invention with its longitudinal axis horizontal.
Figure 3A:
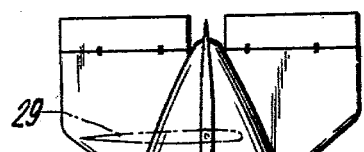
FIGS. 3a-3b are side views showing mounting and positioning means according to one aspect of the present invention.
Figure 3A:
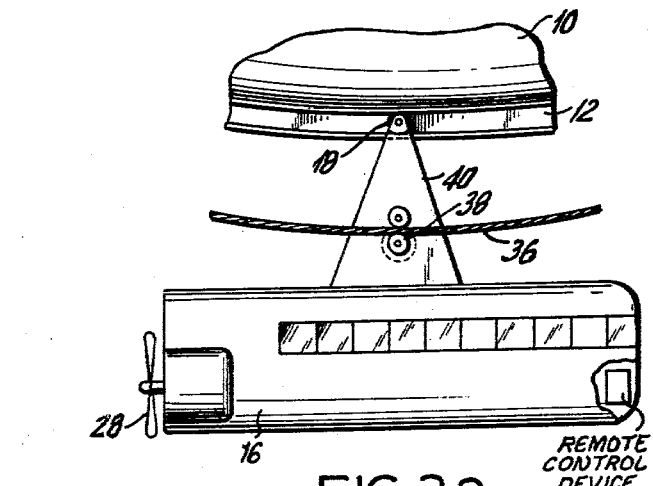
Figure 2:
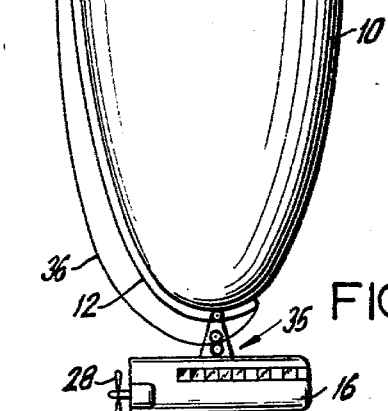
FIG. 2 is a side view of an airship according to the present invention with its longitudinal axis vertical.
Figure 3B:
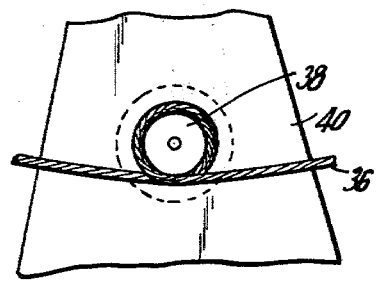
Figure 4:
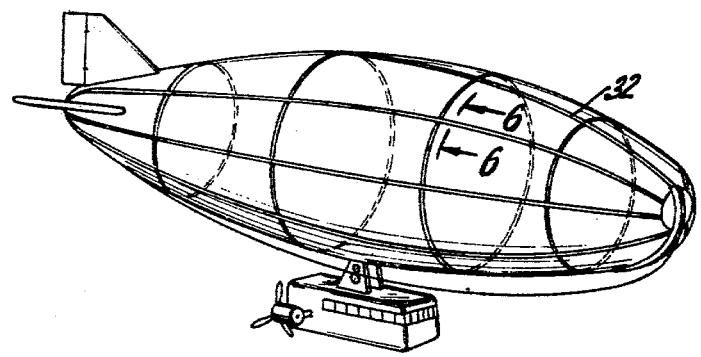
FIG. 4 is a perspective view of the outer skin support structure for an airship employing the present invention.
Figure 5:
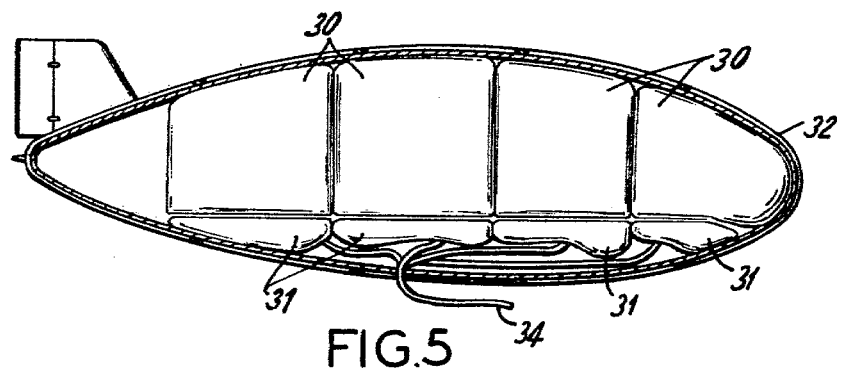
FIG. 5 is a cut-away view showing internal gas bags.
Figure 6:
FIG. 6 is an enlarged view along section 6—6 of FIG. 4.
Figure 7:
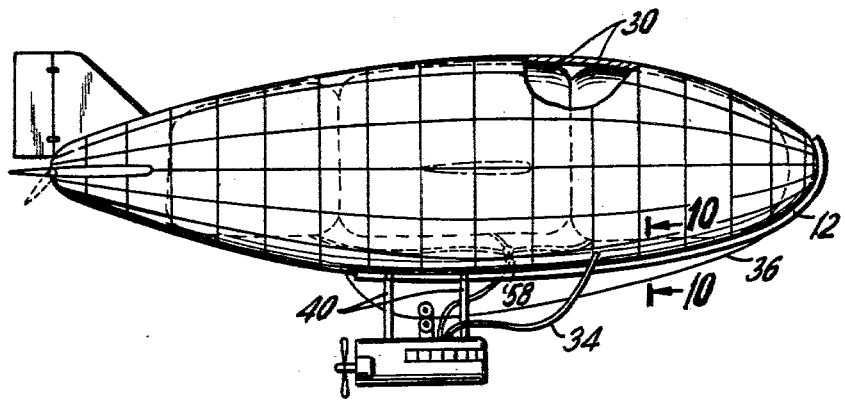
FIG. 7 is a side view of an airship having multiple support members affixed to one or more structural/track members.
Figure 8:
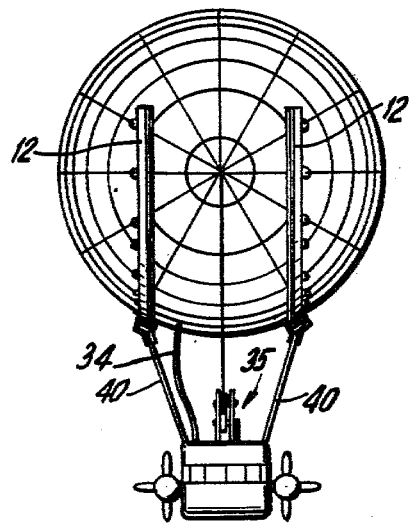
FIG. 8 is a front view of an airship according to the present invention having two structural/track members.
Figure 9D:
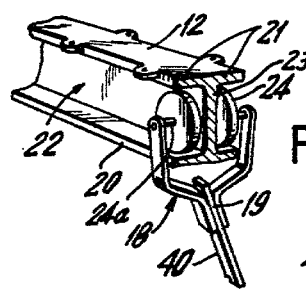
FIGS. 9a-9b are perspective views of structural/track members, mounting means and positioning means according to different aspects of the present invention.
Figure 9A:
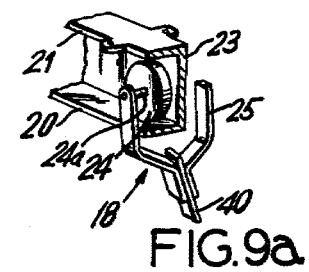
Figure 9B:
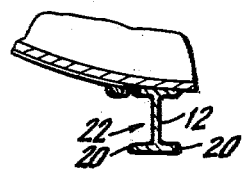
Figure 10:
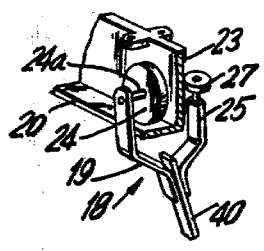
FIG. 10 is an enlarged view of section 10—10 of FIG. 7.
Figure 9C:
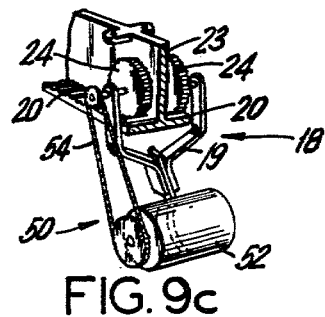
Figure 11:
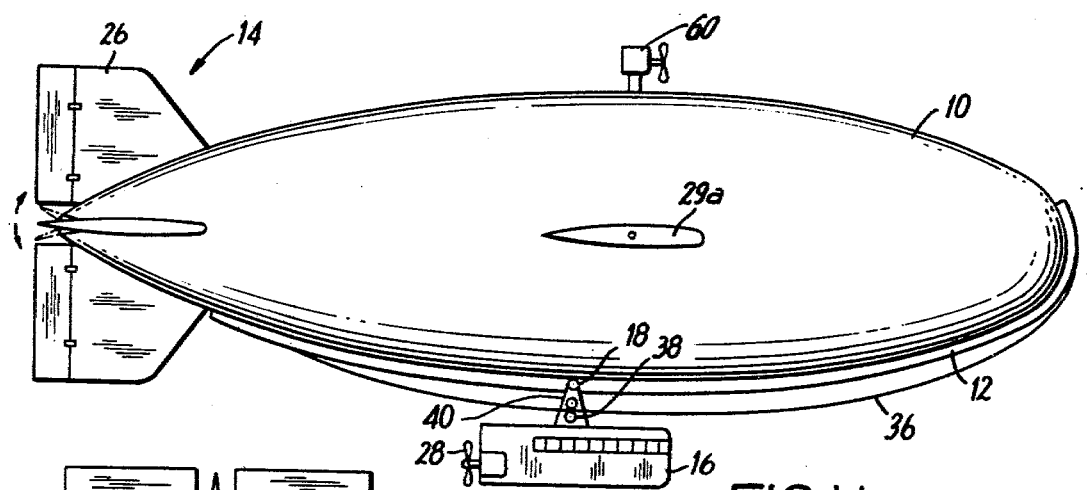
FIG. 11 is a side view of another embodiment of the present invention.
Figure 12:
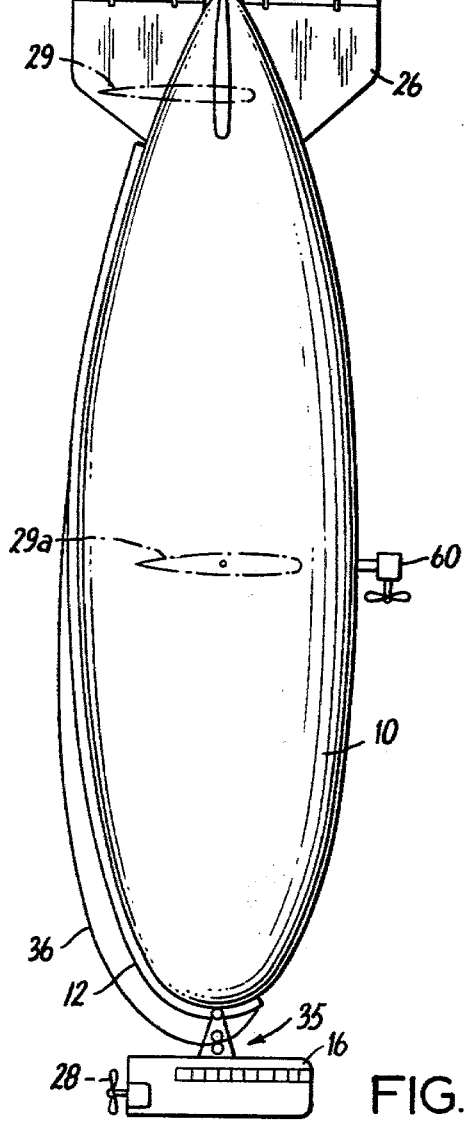
FIG. 12 is a side view of the embodiment shown in FIG. 11 in a generally vertical configuration.
Figure 13:
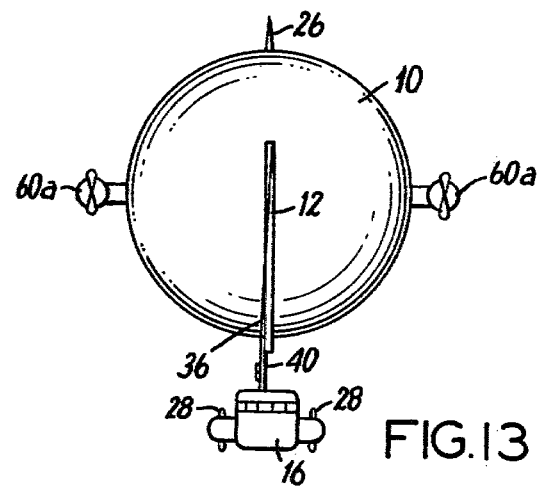
FIG. 13 is a front view of still another embodiment of the present invention.
Figure 14:
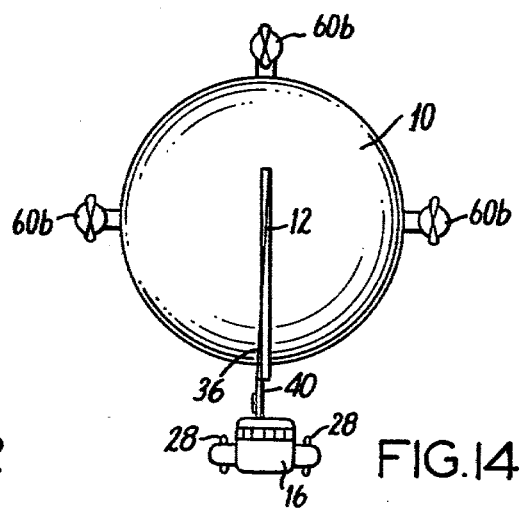
FIG. 14 is a front view of yet another embodiment of the present invention.
Figure 15:
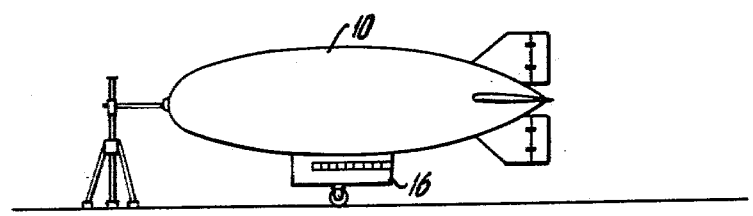
FIG. 15 is a side view of anchoring means for conventional airships.
Figure 18:
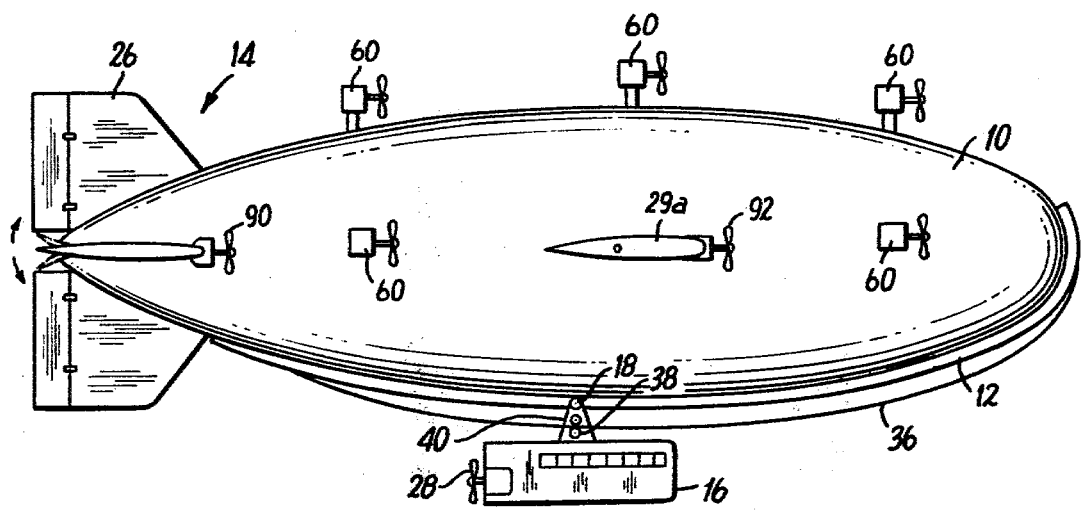
FIG. 18 is a side view of an embodiment of the invention having groups of propulsion devices mounted to the gas-containing structure.

It will be understood that by attaching "short track" 12a directly to the envelope structure (as well as "long track" 12) the airship is provided with structural integrity between the envelope and the gondola. In addition, the track can, for ease of and low costs of fabrication, be integrated as part of the frame of a rigid-type airship or as part of the envelope structure in non-rigid-type airships, such as by attachment by the attached straps encircling the envelope of the airship (as indicated in FIG. 8).

Figure 21:
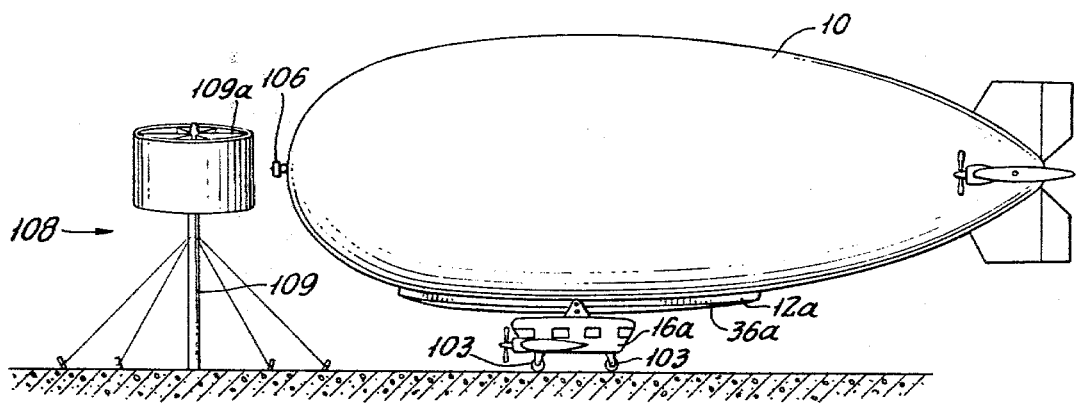
FIG. 21 is a side view illustrating an alternate embodiment of apparatus for anchoring airships, according to the present invention.

Turning now to FIG. 21, there is shown an alternate means for anchoring the airship. According to this aspect of the invention, magnet means (here indicated by reference number 106) are mounted to the airship generally at the nose of the envelope structure. In addition, an anchoring structure (indicated generally at 108) is secured to the ground and adapted to support a magnetically attractive member at a height sufficiently high to meet magnet means 106 when the airship either has landed or is within about two feet of touching ground.

Also, as preferably embodied, the gondola is generally slidably mounted to the airship envelope by track 12a, substantially as described above with reference to FIG. 19.

In operation, the airship is caused to descend by increasing the effective density of the lighter-than-air gas within envelope 10 and/or by use of downwardly thrusting rotatably mounted propulsion devices, as described above with reference to FIG. 19 until it is generally at ground level. Then, with the nose of the airship facing into the wind (to minimize the cross-sectional area of the airship facing directly into the wind), the thrust from the propulsion devices can be oriented so as to propel the airship toward anchoring member 108. (In fact, if there is sufficient smooth land area available, the airship can be driven along the ground and propelled toward mast 108 similar to a taxiing aircraft).

Once magnet means 106 is in contact with, or positioned within attracting distance of the magnetically attractive portion of member 108, magnet means 106 can be activated for magnetic attraction to member 108. After means 106 and member 108 are in contact, the airship may be mechanically coupled to member 108 for fixed anchoring to the ground, whereafter magnet means 106 can be de-activated. As preferably embodied, anchoring member 108 is made up of a mast-like stanchion 109a rigidly attached to the ground and magnetically attractive drum 109b rotatably mounted to stanchion 109a.

Although the method and associated apparatus for landing and anchoring described with reference to FIG. 21 would require as much land area while anchored as conventional techniques, it still enables the pilot in the airship to anchor the ship without requiring a ground crew. Thus, the pilot can simply guide the airship into anchoring configuration by appropriately aligning stanchion 109a with suitable apparatus in the gondola cockpit and maneuvering the airship forward, into the wind, until magnet means 106 is in contact with the rotatable drum 109b. Thereafter, the pilot or a crew member can clamp or otherwise mechanically anchor the airship to drum 109b so that the airship can rotate about stanchion 109a on roller means 103 attached to the bottom of gondola 16a which, in turn, can be positioned along track 12a at the static center of gravity to optimize the support for the anchored airship. In addition, by utilizing a gondola movably attached by track 12a the gondola can be re-positioned therealong to maintain a generally horizontal attitude for the airship during landing and anchoring maneuvers.

Alternatively, as shown in FIG. 22, magnet 106 may be attached to the front of the gondola (in place of attachment means 70 described with reference to FIG. 16) with castor means 103 mounted to the bottom of the gondola. Anchoring structure 108 (including mast 109a with rotatable drum 109b) will be suitably reduced in height for locating the magnetically attractive portion (109b) at a height corresponding to the anticipated levels at which magnet 106 on the gondola will reside on various airships, and for accommodating envelope 10 which will reside over structure 108. In addition, it will be understood that an airship with magnet 106 mounted to the front of the gondola may include the full track 12 or the "short" track 12a, as described above, or it may have the gondola fixedly mounted to the envelope. With a fixed gondola, the point of attachment of magnet 106 should be generally forward of the center of gravity of the airship to keep the airship level during the "weather vane" rotatability described above, with castor means 103 mounted to the airship aft of magnet 106 preferably on the gondola.

In operation, the airship pilot simply guides the descended airship directly towards mast 108 for engagement by magnet means 106 substantially as described with respect to FIG. 21. However, since the mast will be within direct view as compared with that in FIG. 21, anchoring may be easier to accomplish.

It will be understood that any of the magnet means described hereinafter with reference to FIGS. 24–28 may be adapted for use with the embodiment shown on FIG. 22. Thus, for example, plate 120 in FIG. 24 may be curved to correspond to the curvature of drum 109a and magnet member 112 may be provided with similar curvature and adapted to travel in an arc-like pattern behind plate 110 for operating substantially as described hereinafter. Alternatively, the front of plate 110 may be curved but the back of plate 110 and the pole-end of magnet member 112 can be flat since the decrease in flux strength will generally be insignificant over the portions of the keepers, which will be thickened to provide the necessary curvature.

Turning now to FIG. 22, there is shown another embodiment of anchoring means according to the present invention, wherein anchoring means 100 is attached directly to the airship envelope 10 by support member 101 which, advantageously, provides the rotatability described above. In this way, if the airship gondola is fixedly attached to the envelope at or near the center of gravity of the airship support 101 may be positioned generally between the gondola and the nose of the airship to enable the airship to rotate about its anchoring point generally like a weather vane on one or more castor means 103 mounted to the bottom of the gondola. Advantageously, magnet means 100 may be one of those assemblies described below with respect to FIGS. 24–28. Preferably, such magnet means includes a servomotor mechanism operable from the gondola for effecting movement of the magnet member with respect to the keeper member since the magnet member will be located remotely from the gondola.

It will be understood that the magnetic means described herein may comprise an electromagnet operable from the gondola. However, in FIGS. 24–27, there are shown various embodiments of magnet means according to the present invention, which enable utilization of the latest-design permanent magnets, such as the so-called "rare-earth" magnets, which have been found stronger, pound-for-pound, than conventional electromagnets, and retain their strength essentially indefinitely.

Referring specifically to the structure illustrated in FIG. 24, plate 110 is mounted to the bottom of gondola 16 by support struts 111. Plate 110 is preferably formed of a non-magnetic material, such as brass, plastic or, preferably, aluminum (shown with shading), but has inserts (indicated at K) of highly magnetically attractive material embedded therein at predetermined spaced locations. Adjacent plate 110 is magnet structure 112, also made of a non-magnetically attractive material (preferably aluminum for durability and light weight), which houses one or more permanent mangets M. Advantageously, between magnet structure 112 and plate 110 is provided a low friction layer or coating, such as a "TEFLON" coating, to enable magnet structure 112 to be slid over the keeper inserts embedded within plate 110.

In addition, magnet member 112 is mounted to gondola so as to be movable between open-flux and closed-flux positions. To this end, for example, lever 114 may be pivotally attached to magnet member 112 and attached to gondola 16 by support members 116 so as to be pivotal about its connection point yet slidable with respect thereto to enable magnet member 112 to slide over plate 110 while remaining in contact therewith, as by the slidable/pivotal coupling between lever 114 and support 116, indicated at 115.

Thus, with both north (N) and south (S) poles of each magnet in member 112 covered by the same keeper element K, the magnetic flux of each magnet element is short circuited so that essentially no magnetic attraction occurs between plate 110 and plate 120 embedded in the ground, as shown in FIG. 24. However, when the position of magnet structure 112 is shifted so that two different keeper elements cover the poles of the same magnet, with each keeper covering similar poles of different magnet elements, the flux is open and attraction between plates 110 and 120 occurs.

As preferably embodied, the connection between supports 111/116 and the gondola are adapted to enable rotation of plate 110 (and magnet member 112) with respect to the gondola. Moreover, it will be understood that lever 114 may be eliminated and that member 112 may be coupled to a servo-motor mechanism, operable from and rotatably mounted to the gondola so that the re-positioning of member 112 on plate 110 may be effected remotely from the gondola rather than manually.

In operation, when the airship has been positioned over the landing site, member 112 may be positioned in the open-flux position (as in FIG. 25b) for attracting the airship towards plate 120. Once mating has been effected, plate 110 can be clamped or otherwise mechanically secured to plate 120 (or any other structure secured to the ground) to firmly anchor the airship. When ascent is desired, the mechanical clamp is removed and the member shifted to the closed-flux position (as in FIG. 25a) to remove the attraction between plates 110 and 120 so that the airship can lift-off.

Turning now to FIGS. 26-28, there is shown an alternate embodiment of the aspect of the present invention described with reference to FIGS. 24 and 25. According to this embodiment, the magnets are held on their sides in a circular or cylindrical structure 122 which in turn is positioned in rotatable posture relative to and adjacent cylindrical member 124 which is made of non-magnetic material and holds keeper elements K. Advantageously, keeper-holding cylinder 124 may be rotatably mounted to the gondola and magnet-holding member 122 may be rotatably mounted within member 124. However, it will be understood that magnets M and keepers K could be reversed, with the magnets in outer cylinder 124 and keepers in inner cylinder 122.

In operation, when the airship is properly positioned over the landing site, the magnets can be aligned so as to overlap keeper elements as illustrated in FIG. 28 for attraction to steel plate 120 (followed by mechanical coupling therebetween, as described above). When ascent is desired, the coupling is released and the inner cylinder can be rotated, as by handle 126 so that each magnet is covered by a single keeper to close the flux and allow the airship to ascend.

It will be understood that although the outermost cylinder is rotatable with respect to the gondola and the inner and outer cylinders are rotatable with respect to each other, the relative positioning of the inner and outer cylinders must remain fixed at any given time in order to maintain the desired alignment between keepers and magnets. Thus, for example, lever 126 on inner cylinder may be provided with locking means for maintaining the desired relative positioning between the cylinders. However, as indicated above, it will be understood that a servo-motor mechanism or other mechanized drive means may be utilized to rotate the one cylinder relative to the other, yet maintain the desired relative positioning Turning now to FIGS. 29 and 30, there is shown another embodiment of magnetic anchoring means according to the present invention, adapted to be attracted to plate 130 which, like plates 104 and 120 described above, is made of a magnetically attractive material. According to this embodiment, the anchoring means includes hollow shaft 132 extending from the bottom of gondola 16 with a relatively large-area disc-like base portion, 134, formed at the other end of shaft 132. Base portion 134 is formed with a central cavity (indicated at 136) adapted to enclose magnet 138, preferably a powerful permanent magnet such as a Samarien Cobalt magnet, and enable slidable movement of magnet 138 within cavity 136, as explained more fully below.

In order to prevent chipping or other damage to magnet 138 (either due to sliding within bore 136 or due to repeated contact with plate 130), particularly if it is a brittle-like magnet such as the Samarien Cobalt magnet, magnet 138 may be retained within a casing, indicated at 140. Casing 140 is preferably made of a nonmagnetic material such as aluminum and encases the magnet along all of its surfaces except its bottom surface.

Located within shaft 132 is elongate actuating member 142 which may be a rod-like member securely attached at its lower end to casing 140 (as by coupling to enlarged portion 140a of casing 140) and to a motor, winch, lever or other suitable lifting means for moving magnet 138 within cavity 136. As here embodied, the lifting means comprise motor 144, mounted to frame 146 (secured within the gondola), which drives pulley (or drum) 144a in the two rotational directions indicated by arrow 145. Cable 148 is attached at one end to pulley 144a and coupled at its other end to the upper end of rod 152a which in turn is coupled (as explained more fully below) to rod 142 for pulling magnet 138 upwardly or allowing it to move downwardly under the influence of gravity when attraction to the magnetically attractive anchoring structure is desired.

Accordingly, when the airship has descended for anchoring motor 144 is activated to position the bottom surface of magnet 138 in generally co-planar relationship with the bottom surface of base bottom 134, so that magnet 138 can make physical contact with anchoring plate 130. When ascent of the airship is desired, motor 144 is activated to pull on rod 142 and, therefore, lift magnet 138 within cavity 136. In turn, magnet 138 will be disengaged from anchor plate 130 by virtue of motor 144 simultaneously pulling upwardly on member 142 as well as "pushing" downwardly against the rigid combination of base 134, shaft 132 and frame 146 to bear directly against anchor plate 130.

As preferably embodied, shaft 132 is coupled to the gondola to enable free rotation of the airship about the anchoring site (i.e., about the axis of shaft 132) without affecting the magnetic attraction between magnet 138 and plate 130. To this end, cable portion 148 is attached, via rod 152a, to a bearing assembly which in turn, is coupled to the upper end of rod 142. The bearing assembly includes cylindrical yoke 150 to which cable 148 is attached via a pivotal cross bar assembly (indicated generally at 152). Cross-bar assembly 152 includes rod 152a which is affixed at one end to cable 148 and, at its other end, pivotally attached to cross-bar connecting member 152b which, in turn, is secured to yoke 150. In addition, the upper end of rod 142 is coupled to the other end of yoke 150 by bearing plate (or ring) 154 which is fixedly secured to the upper end of rod 142 (here, by threaded fastener 153 which is accessible through opening 155), with ball thrust bearing assembly 156 positioned between bearing plate 154 and the bottom of yoke 150. It will be understood, of course, that the coupling between rod 142 and bearing plate 154 must be sufficiently strong to withstand the axial forces developed in rod 142 for lifting magnet 138.

Shaft 132 itself is also rotatably mounted to the gondola. To this end, annular member 158 is rigidly attached to the bottom of gondola 16 (as by bolting a flange portion formed at one end of member 158 to the gondola floor with bolts 159), with rod 142 extending therethrough, Annular member 158 has groove 160 extending around the exterior of its other end and ring member 162, proportioned to fit within groove 160, is secured to the interior of shaft 132 (as by bolts 164) during assembly of the anchoring structure or it may be two half ring sections. Like the connection between bearing plate 154 and rod 142, the connection between the upper end of shaft 132 and lifting motor 144 must be sufficiently strong to withstand the lifting forces for magnet 138.

Accordingly, when the airship is magnetically anchored to anchoring plate 130 and the wind acting on the airship changes direction, tending to cause it to rotate, the rotation capability provided by annular member 158 and thrust bearing assembly 156 enable the airship to rotate completely around the anchoring point, without affecting the magnetic attraction between magnet 138 and plate 130. In addition, if desired, a castor or other roller means may be attached to the airship at a point aft of the anchoring assembly to facilitate such rotation of the airship, such as, for example, on the lower vertical stabilizer.

Advantageously, base portion 134 is proportioned with a relatively large area, in diameter about 1/25 to about 1/30 the over-all length of the airship. In this way, a much greater force (generated by wind acting on the airship and tending to lift one end) will be required to overcome the magnetic attraction between magnet 138 and plate 130. Thus, since the magnetically attractive force acts at a moment arm equal to about the radius of base portion 134, the net upward lifting force, L, acting on one end of the airship, needed to overcome the magnetic anchoring, will have to be such that $$L \cdot d \geq F \cdot r \tag{1a}$$

or, $$L \geq (F \cdot r / d) \tag{1b},$$

where F is the net force of magnetic attraction between magnet 138 and plate 130 (i.e., accounting for the net lift of the gas in the airship), r is the radius of base portion 134, and d is the distance from the anchoring means along airship to the point at which the net upward lifting force L acts. It will be understood that the force L will be the net force distributed along the surface of the airship as a result of the wind acting thereon.

Figure 29:
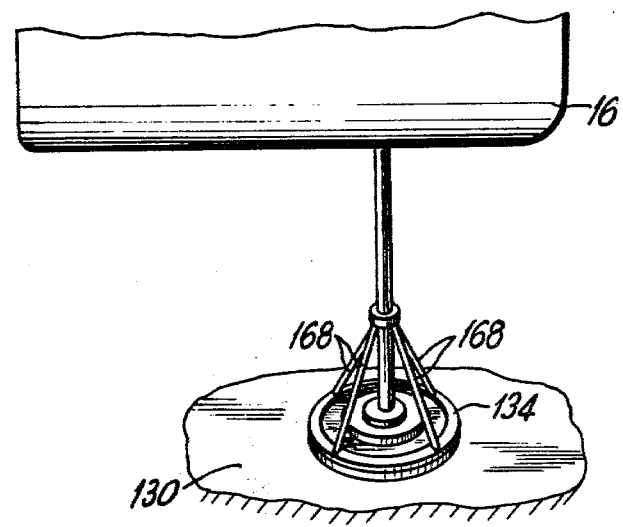
FIG. 29 is a perspective view of an embodiment of magnet anchoring means according to another aspect of the present invention.
Figure 30:
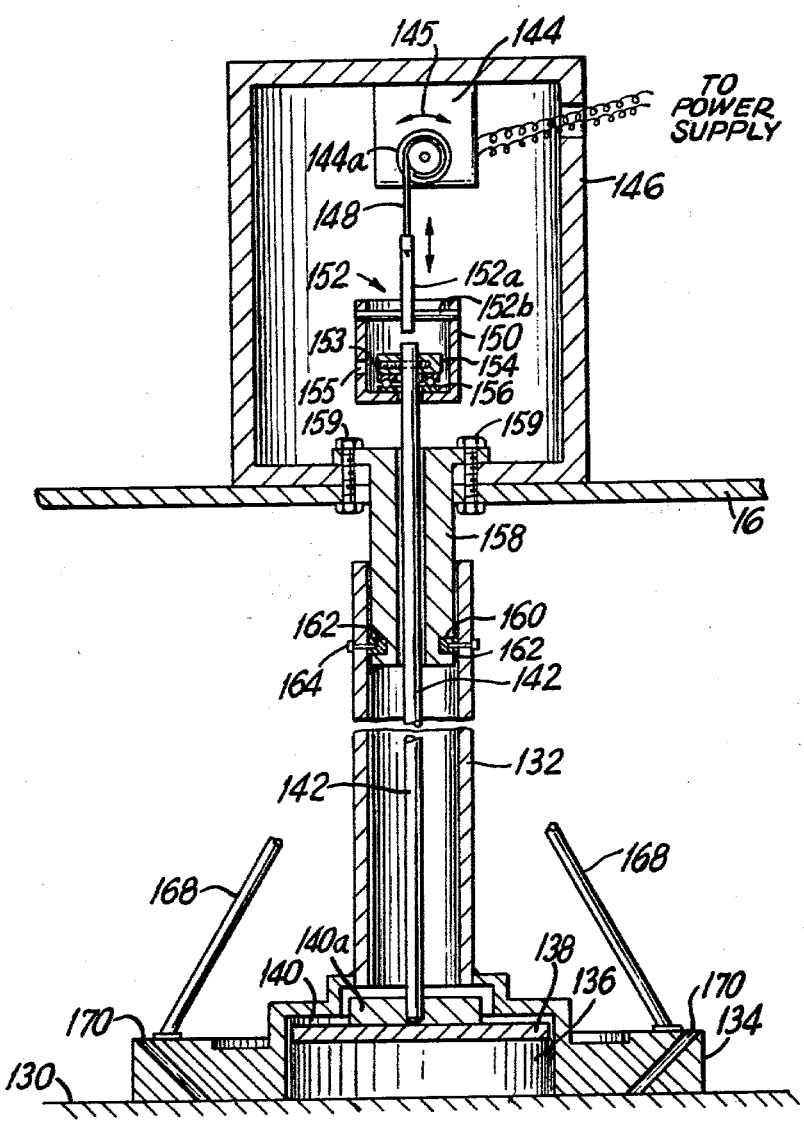
FIG. 30 is a sectional view of the embodiment shown in FIG. 29.
Figure 31:
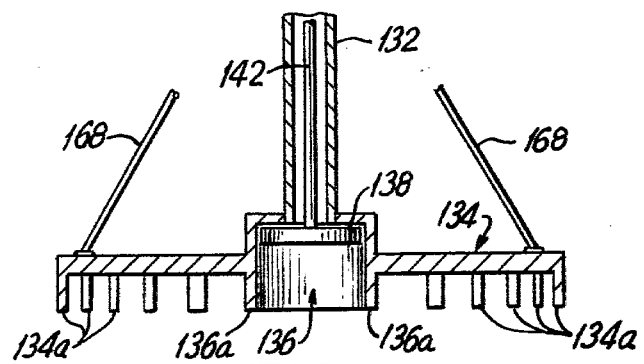
FIG. 31 is a partial sectional view of an alternate embodiment of portions of the apparatus shown in FIG. 29.

Turning now to FIG. 31, there is shown a modified embodiment for the aspect illustrated in FIGS. 29 and 30, which may be useful in reducing the weight of the anchoring support structure 132/134. As here embodied, a plurality of feet 134a may be formed on base portion 134 rather than forming base portion 134 as a solid member and a separate cylinder-like wall (indicated at 136a) may be provided for defining cavity 136. In this way, the requisite radius for base portion 134 as well as the height for cavity 136 will be provided with a minimum of weight. Alternatively, base portion 134 may be formed with a plurality of vanelike ribs (not shown) extending radially outwardly from cylinder wall 136a to the edge of base portion 134.

Figure 32:
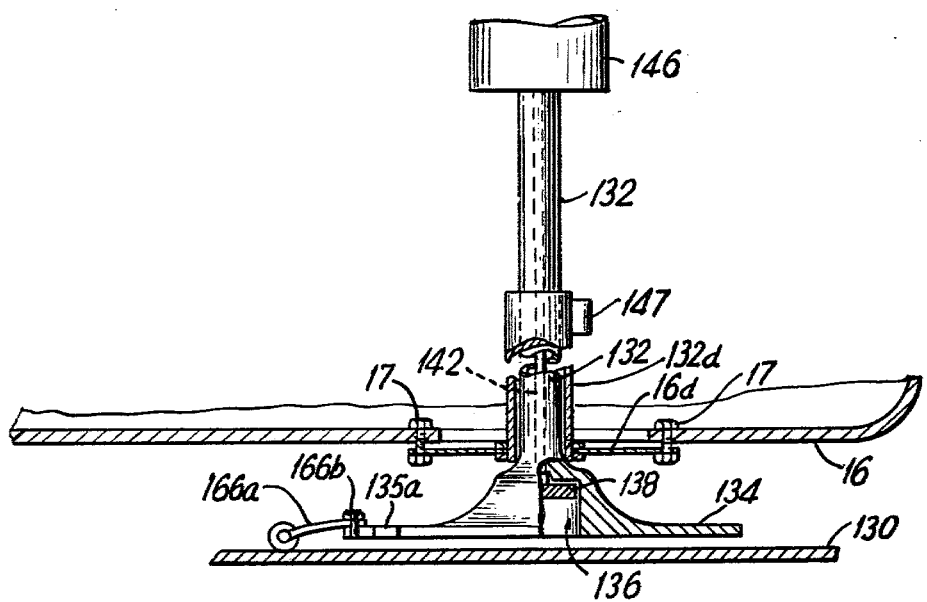
FIG. 32 is an elevation view, with a portion broken away, of another embodiment of an anchoring structure according to the invention.

Referring to FIG. 32, there is shown another embodiment of the feature illustrated in FIG. 29. As here embodied, the anchoring apparatus may be mounted to the gondola by a generally strong but flexible mounting disc-like plate (indicated at 16a) which is attached to the airship adjacent an aperture formed therein by, for example, bolts 17. Plate 16a is adapted to flex somewhat for permitting small vertically-oriented rotation of the airship's longitudinal axis (i.e., rotation about a horizontal axis extending through the point of attachment of shaft 132). In addition, base portion 134 may be formed in a somewhat bell-shaped configuration from a lightweight material such as a carbon fiber composite sold by Union Carbide, and may be solid except for cavity 136 formed therein.

Also as illustrated in FIG. 32, the anchoring mechanism according to the present invention may be adapted to be telescoping, or retractable, so that the base portion 134 may be positioned adjacent the airship (here, adjacent the gondola) during flight for minimizing any effect is might have on in-flight maneuvers. To this end, shaft 132 may be elongated and slidably retained within cylindrical sleeve 132a which is attached to plate 16a. Motor means 147 is secured to sleeve 132a for moving shaft 132, up or down, within sleeve 132a and for locking the position of shaft 132 therein when the desired configuration is achieved. Motor means 147 may, for example, be a gear motor and shaft 132 may be formed with gear teeth thereon for engaging the drive gear mechanism on motor 147.

The top of shaft 132 may be formed with lifting means similar to that described above with reference to FIG. 29, as indicated by frame 146 shown affixed to the top of shaft 132 in FIG. 32. In addition, the anchoring assembly may be adapted to permit rotation of the airship when anchored, as by rotatably mounting sleeve 132a to plate 16a, similar to the rotatable mounting of shaft/collar 132/158 described above with reference to FIG. 30.

In operation, when anchoring is desired, motor means 147 is energized to lower shaft/base-portion assembly 132/134 until frame 146 is positioned adjacent the upper edge of sleeve 132a. When so positioned, the anchoring apparatus may be operated as described above for anchoring and disengagement from anchor plate 130. However, once the magnetic anchoring has been disengaged and the airship is in flight, shaft 132 may be raised within sleeve 132a until base portion 134 is adjacent the gondola which, when desired, may be formed with a housing-like structure adapted to receive the base portion 134 and provide a stream-line configuration on the bottom of the gondola so that the anchoring structure will not interfere with the airship's flight (e.g., by not generating drag on the airship).

The magnetic mounting means illustrated in FIG. 29, 30 and 32 may also be provided with roller means to enable the airship to taxi to its anchoring position. To this end, and referring more particularly to FIG. 33, one or more castor-like roller assemblies 166 are attached to base portion 134, extending at least partially below the bottom surface thereof. Roller assemblies 166 may also be adapted to be withdrawn, or retracted, above the bottom surface of base portion 134 so as not to interfere with magnetic contact between magnet 138 and plate 130.

Figure 33:
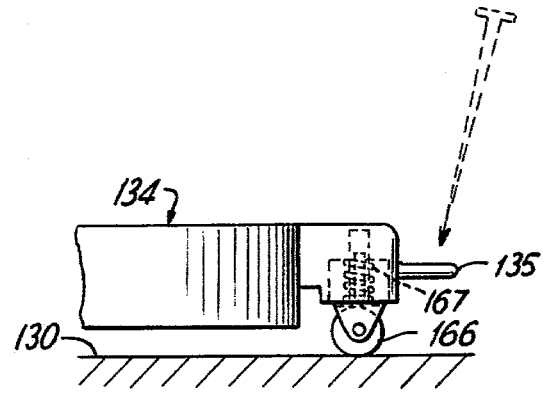
FIG. 33 is an elevation view of a portion of the embodiment of FIG. 29, showing another aspect of the invention.

For example, each roller assembly 166 may comprise a mechanically retractable wheel assembly (not shown) incorporated into base portion 134, adapted to position the wheels above and below the bottom surface of base portion 134. Alternatively, each roller assembly 166 may comprise a simple castor-like member, such as shown in FIG. 33, which is biased (as by spring 167) in the extended configuration by a force sufficient to maintain the wheel below the bottom surface of base 134. However, the force of spring(s) 167 should not be so great as to interfere appreciably with the magnetic attraction between magnet 138 and plate 130 when anchoring is desired. Or, the roller assembly may comprise a wheel attached to base portion 134 by an elongate resilient biasing member 166a which is secured thereto by bolt 166b, preferably adapted to permit rotation of member 166a, as shown in FIG. 32.

Where roller means 166 comprise spring-biased castor-like wheels, it may be particularly advantageous to utilize multidirectional propulsion devices, such as described above with reference to FIGS. 23a and 23b or, preferably, the propulsion apparatus described below with reference to FIGS. 37–39, to produce an upwardly directed thrust, driving the airship downwardly to overcome the spring biasing in the roller means 166 when anchoring is desired.

Referring again to FIGS. 30 and 31, a plurality of support arms 168 may extend upwardly from base portion 134 to shaft 132 for strengthening the combined assembly made up of base portion 134 and shaft 132. In addition, base portion 134 may be formed with a plurality of slots 170 extending at an angle relative to (or parallel to) shaft 132 completely through base portion 134 so that elongate stakes or spikes (not shown) can be inserted into the slots and hammered into the ground. This is particularly useful where the airship is utilized in sport or other applications wherein landing and anchoring will be conducted in areas without plates of magnetically attractive material such as, for example, in open fields. Alternatively, as shown in FIG. 33, base portion 134 may be provided with one or more large eye bolts 135 attached to an edge thereof, through which a steel post or stake (shown in phantom in FIG. 33) may be inserted for hammering into the ground. Thus, once the airship has touched down, a crew member can climb out of the gondola and drive the stake through the eyelet in eye bolt 135 and into the ground. The crew member can stand on base 134 so as not to lighten the ship, or, if he steps off, the propulsion devices (described below with reference to FIGS. 37–39) can be used to keep the airship down until anchored.

It will be understood by those skilled in the art that the anchoring assembly illustrated in FIGS. 29 and 30 could also be clamped by base portion 134 to a suitable anchoring member in a manner generally analogous to that described above with reference to FIG. 17. However, the anchoring member secured to the ground need not be provided with rotatable capability since the magnetic anchoring assembly secured to the ship can accommodate rotation.

Turning now to FIGS. 34 and 35, there is shown another embodiment of anchoring means according to the invention, which may be adapted for use with an anchoring structure such as described above with reference to FIGS. 21 and 23a. To this end, cylinder-like support member 270 may be mounted to the nose of the airship by, for example, bolting it to part of the frame of a rigid airship or by securing it to the airship skin (indicated at 269) of a non-rigid airship. The attachment may be facilitated by sandwiching skin 269 between two contour plates 272 which may be bonded to the skin and also fastened together by bolts 271 extending through block members 274a and 274b, with suitable caulking (indicated at 276) placed around the bolts, and, if desired, between each plate and the skin, to prevent gas leakage.

Block member 274a is secured to, or forms part of, one end of cylinder-like member 270, which houses a motor mechanism (indicated generally in phantom at 278) for moving magnet 138' (held within casing 140' as described above) within the other end of cylinder-like member 270. Magnet 138' may be coupled to motor mechanism 278 by actuator member, or rod, 132' for movement in the open end of member 270. In addition, motor means 278 may be a direct drive motor adapted simply to move rod/magnet assembly 132'/138'.

Alternatively, motor 278 may be similar to lifting assembly 144–148 except that there will be no need for providing rotatable coupling analogous to bearing assembly 152–155 and collar coupling 158–162 described above. In addition, if a simple cable couples a pulley on the motor to rod 132', magnet 138' may be biased towards a forward position to ensure that it will move to the end edge of member 270 for engaging the anchoring member described below. To this end, cylinder-like member 270 may include a partition (indicated in phantom at 280) having an opening to accommodate rod 132', and a spring (indicated in phantom at 282) positioned, in compression, between partition 280 and the back of magnet 138'. Spring 282 may be made of brass or other resilient non-magnetically attractive material and motor 278 may be electrically operated (as indicated by conductors 279 which may lead to a reversing switch for moving rod 132' in both directions) to enable "fly-by-wire" operation of the airship, as will be described more fully below.

For anchoring, a mast-like structure (indicated generally at 284), similar to anchoring structure 108 described above with reference to FIG. 21, is secured to the ground at the anchoring site. However, the anchoring drum (here, indicated at 284a and made from a magnetically attractive material) which is rotatably attached to mast 284b, is provided with planar surfaces so that the flat surface of magnet 138' may make magnetic engagement over the entire surface of the magnet. In addition, drum 284a may be adapted to provide a flat surface perpendicular to the wind direction since airships are usually headed into the wind when anchoring. For this purpose, weather vane 285 is affixed to the top of rotatable drum 284a and oriented perpendicular to two opposite disposed planar panels (indicated at 284a' and 284").

Accordingly, the airship may drive up to mast-like structure 284, substantially as described above with reference to FIG. 21. At the same time, magnet 138' may be positioned with its free surface flush with the front edges of cylinder 270 (either by moving the magnet by a direct drive motor or by allowing the biasing of spring 282 to move the magnet). Magnetic engagement may thence be had between drum 284a and magnet 138' when the edge of member 272 abuts panel 284a. Thus, the airship will be magnetically secured to the rotatable drum 284a and can rotate about structure 284 substantially as described above with reference to FIG. 21, assuming some roller means are affixed to the airship, like rollers 103 described above with reference to FIG. 21.

Alternatively, and referring more particularly to FIG. 36, drum 284a may be a wedge-shaped member, such as a generally isocelese triangle with two long sides (indicated at 286a and 286b) and a short base (indicated at 286c) adapted to be engaged by magnet 180'. Thus, the drum itself (preferably with its rotatable connection to mast 284b nearer the intersection of the two long sides 286a and 286b than base side 286c) can act like a weather vane so that flat surface 286c will always be oriented perpendicular to the wind.

It will be understood that cylinder-like member 270 may be formed on the front of the gondola and mast-like structure 284 may be a relatively short structure such as described above with reference to FIG. 23a. In addition, the anchoring apparatus described with reference to FIGS. 29–33 may be mounted at any convenient point on the airship, preferably forward of mid-ship, rather than to the gondola, as described above with reference to FIG. 22. Moreover, it will be understood that the various anchoring apparatus described above with reference to FIGS. 29–35 are particularly useful with airships having gondolas fixedly mounted to the airship envelope.

Referring now to FIGS. 37–39, there is shown a particularly useful embodiment of propulsion means according to the present invention. It will be understood that the propulsion means hereinafter described is particularly advantageous when used on an airship having anchoring means like that described with reference to FIGS. 29–33, but also offers particularly advantageous results when used on virtually any airship, as will be described more fully below.

According to this aspect of the invention, the propulsion means are mounted to the airship so as to be movable in a direction generally parallel to the longitudinal axis of the airship, with a single motor, or drive means, operating a pair of rotatably mounted propellers. Referring more specifically to FIG. 37, wherein only a portion of the airship is shown and indicated by reference number 10, a frame structure is attached, preferably, to the bottom of airship 10 and includes two downwardly projecting support members 200 fixedly mounted to the airship. Track members 202, having an inverted L-shaped configuration, are attached to each track member 200, along with a toothed rack 204 on the upper surface of each track member 202.

A second frame structure made up of two support members 206, coupled by and spaced apart by shaft 208, is movably supported on track members 202 by toothed gears 210 attached to the ends of shaft 208 (which is rotatably held to members 206 by collar bearing members 212) and adapted to engage the teeth on rack 204, and by two rollers 214 also attached to each frame member 206 to ride within the track-like trough provided by each track member 202. In order to move the second frame structure (made up of frame members 206 and shaft 208), reducer motor 218 is mounted to frame member 206 and operably coupled to shaft 208 for turning the shaft relative to frame members 206 and, thereby, move gears 210 on rack 204 so that the entire second frame structure can move fore and aft relative to track members 200.

Also attached to track members 206 of the second frame member is the propulsion drive mechanism. As here embodied, tubular shaft portions (each indicated at 220) are fixedly mounted to each frame member 206, extending outwardly therefrom to a point where the propulsion devices are mounted, as described more fully below. Drive shaft 222 is rotatably mounted within shaft portions 220 by suitable bearing means (not shown) and bracket 224 is fixedly attached to the inner ends (indicated at 220a) of shaft portions 220, as by bracket legs 224a, for maintaining alignment of the inner channel of shaft portions 220 to prevent damage to drive shaft 222 therein. In addition, drive means 226 are supported in operable coupling with drive shaft 222 by bracket 224, with drive shaft 228 extending from and rotatably driven by drive means 226 and received in bearing means 230 held by one of legs 224a on bracket 224. Drive gear 232 is fixed on motor shaft 228 and engages gear 234 fixed on shaft 222, so that drive means 226 can drive the propellers coupled to the ends of drive shaft 222.

The propeller coupling mechanism formed at the outermost ends of shaft portions 220 includes propeller assembly support frame 236 attached to shaft 220 and adapted for rotation relative thereto. Rotation of frame 236 is governed by servo-motor 238 (mounted to the end of each shaft portion 220) from which servo-motor drive shaft 240 extends for operating gear 242 affixed thereto, which gear in turn drives gear 244 affixed to frame 236.

Attached to the end of each drive shaft 222 is a first miter gear 246, disposed within its corresponding frame 236 in operable relation with a larger bevel gear 248 rotatably mounted by shaft 250 to frame 236. One end of shaft 250 extends through the top of its corresponding frame 236 and is adapted to permit attachment of a propeller (indicated generally at 252).

Accordingly, after servo-motor 238 positions frame 236 in a configuration for providing thrust in the desired direction (i.e., to provide the desired vectoring—vertical thrust, horizontal thrust or some combination therebetween), drive motor 226 may be energized to turn drive shaft 222 via the gear linkage between gears 232 and 234, which in turn causes shaft 250 (and thereby propeller 252) to rotate via the linkage between gears 246 and 248. Thus, it will be understood that a single drive motor 226 operates two propellers.

Each propeller unit 252 may be adapted to enable variation of the pitch of the propeller blades. To this end, any conventional variable pitch mechanism may be utilized, such as a collective pitch "swash" plate mechanism, for varying the pitch of propeller blades 252a. As here embodied, each propeller blade 252a is rotatably mounted to propeller support frame 254 with a portion (indicated at 252b) of the mounting shaft of each propeller blade 252a extending into frame 254 and coupled to one of rods 256 extending from "swash" plate mechanism 258 through which shaft 250 also extends. In addition, servo-motor 260 is mounted to frame 236 for governing the orientation (i.e., the pitch) of blades 252a via "swash" plate mechanism 258 and rods 256. Advantageously, each servo-motor 260 is electrically operated and separately controllable for enabling increased maneuverability of the airship and for enabling "fly-by-wire" operation, as will be described more fully below.

It will be understood that since both propellers 252a are operated by the same drive means, each propeller will rotate at the same speed regardless of any differences in pitch between the two blades. This is particularly advantageous since, normally, any reduction in pitch will result in increased rotational speed so that the speed of the engine driving the reduced-pitch propeller must be reduced accordingly to compensate for the increased speed. Thus, there is no need to make such compensation in the propulsion system according to the present invention since both propellers will always rotate at the same speed.

In operation, the propellers can be oriented in the appropriate configuration for producing the desired flight propulsion. For example, with the propellers rotating in a generally horizontal plane, the airship can be driven vertically upwardly or downwardly, by reversing the pitch on the propeller blades. In this configuration, the airship can also be maintained in a hovering attitude for use as a flying crane to lift heavy loads by the combined lifting effect of the lighter-than-air gas and the downwardly directed thrust of propellers 252 (i.e., the propellers are oriented with positive pitch to provide positive, or upward lift to the airship). Once the load has been delivered, the pitch of the horizontally rotating propellers can be reversed to provide upwardly directed thrust for driving the airship, now lightened by the delivery of its load, downwardly to its anchoring site (i.e., the propellers are oriented with negative pitch).

Similarly, with the propellers rotating in a generally vertical plane, the airship can be driven forward or backward, depending on the pitch of the blades. Furthermore, by orienting the propellers to rotate in a plane between the vertical and the horizontal, the airship can be driven to accommodate virtually any wind conditions or maintained at a constant altitude while propulsion is provided at any angle therebetween for accommodating the wind.

The propulsion means described with respect to FIGS. 37–39 are also particularly useful when used on an airship having the anchoring mechanism disclosed with reference to FIGS. 29–33. Before anchoring, the airship may taxi by maintaining the minimum downwardly-directed component of thrust necessary to keep the airship at ground level so that the airship can roll on the roller assembly attached to base portion 134, maneuvering by the horizontally-directed component of thrust. Once the airship is positioned over anchoring member 130, the propellers, may be oriented to provide a strong vertically-oriented downwardly-directed thrust to drive the airship downwardly to overcome the biasing force of the spring-loaded roller assembly 166 or 166a. To this end, the outboard end of shaft portions 220 terminate about even with the vertical tangent to the airship, substantially as described above with reference to FIG. 23b so that at least half the upward thrust generated by the propeller assemblies 252 will clear the airship envelope.

In addition, and of significant advantage in connection with the anchoring means according to the present invention, the propulsion system according to the present invention further enables sideway movement of the airship. The propulsion system enables essentially complete maneuverability at the anchoring site, simply with a collective pitch "swash" plate mechanism, thereby obviating the expense and extra weight of a cyclic pitch "swash" plate mechanism. To this end, shafts 250 can be oriented to extend vertically and one propeller can be oriented to provide negative (i.e., downward) pitch while the other propeller can be oriented to provide positive (i.e. lifting) pitch, but with different degrees of pitch. Alternatively, the propellers can be provided with the same general pitch but with different degrees of pitch. The airship will tend to "roll" away from the side generating the greater thrust (i.e., the side with the greater degree of pitch), thereby causing the airship to move to that side. In a similar way, the airship can be turned around virtually about its vertical axis by orienting the propellers to provide horizontally directed thrust, one in the opposite direction from the other.

However, in order to enhance the sideway movement of the airship, or to create said thrust when the engines are stopped, or hovering, a relatively small thruster propeller motor (indicated at 255 in FIG. 39) is mounted to the airship with the thrust generated thereby oriented generally parallel to shaft 220. As preferably embodied, thruster 255 is adapted to provide reversible thrust, i.e., towards the left or towards the right so that thruster 255 may be activated to assist lateral movement of the ship. Accordingly, when the pitch of propellers 252 are disposed for moving the airship to the left, thruster 255 can be operated to "push" the airship towards the left and a similar arrangement may be affected for moving the airship to the right. Thruster motor 255 may be a gasoline engine with reversible pitch propellers or an electrically operated reversible motor, either one remotely controlled as part of a "fly-by-wire" system.

It will be understood that by mounting the propellers and drive motor to the airship envelope rather than the gondola, the gondola interior will be quieter, as there will be a substantial reduction in the engine vibrations directly transferred to the gondola. Moreover, it will also be understood that more than one drive motor/propeller-pair assembly can be utilized so that the airship can have four, six, etc. propellers operated by two, three, etc., respectively, drive motors. In addition, the variable pitch propeller assemblies may be rotatable through at least about 90° to provide a useful range of directions for the propulsion thrust. However, it is preferred to be rotatable through 180° so that thrust can be provided in virtually all directions in the plane of rotation.

The outer skin of the airship envelope for containing the lighter-than-air gas may comprise one or more laminated sheets made up of a foil layer of aluminum sandwiched between two layers of "MYLAR", with one or more layers of "KEVLAR" between such laminated sheets for added strength when more than one laminated sheet is used. The details of the skin are described in my co-pending patent application, Ser. No. 781,015, filed Mar. 24, 1977, which is hereby incorporated by reference herein, and a strong skin is particularly useful when cylinder-like member 270 is attached to the nose of a non-rigid airship.

Advantageously, if the force (equations 1a and 1b above) is too great to permit anchoring by the method and structure described with reference to FIGS. 29–33, the anchoring structure and the propulsion system described with respect to FIGS. 37-39 can be combined to enable temporary anchoring of the airship until base portion 134 can be clamped or otherwise secured to a suitable anchoring structure (similar to the arrangement described above with reference to FIGS. 17 and 19), or stored in a suitable hangar. In addition, with the anchoring structure described with reference to FIGS. 35-36, an eye bolt 288 may be secured to the airship via plates 272 so that a hook, chain or other fastener can be attached between bolt 288 and hole 289 formed in drum 284a.

It will be found that the methods of apparatus for anchoring according to the present invention enable the airship pilot to land the airship directly on the ground without the need for suspending anchoring mechanisms by cables, or the like, which serves only to encumber the landing and anchoring procedures. In addition, such methods and apparatus, with the propulsion assembly according to the invention, can all be adapted for electrical operation to enable complete "fly-by-wire" operation of the airship.

Those skilled in the art will recognize that certain changes or modifications may be made in the structures described above, without departing from the scope and spirit of the invention as defined in the appended claims. Thus, for example, for large airships, shaft 132 may be relatively short and base portion 134 may be secured as close to the airship as possible to minimize weight, to facilitate operation of the pilot alone and to ensure a structurally strong anchoring assembly. In addition, cable 148 could be coupled directly to yoke 150, as, for example, by a web of cables rather than support arm 152a. Also, magnet 138' could be formed with a rounded surface to engage a round drum 284a to obviate the need for the weather vane adaptation so that the airship can approach the anchoring structure from any direction or despite variable-direction wind conditions.

It will also be understood that magnets 138 and 138' need not be encapsulated by the anchor support member 132/134 or 270. Rather, the magnet can be adapted to be fixed relative to the airship (as by fixed mounting thereto or by a retractable arrangement) and a bearing rod movable relative to the magnet so that the airship can simply descend to the anchoring site until the magnet magnetically engages plate 130 and when ascent is desired, the bearing rod is pushed to bear against anchoring plate 130. For example, one or more magnets (or a donut-shaped magnet) could be embedded in the bottom of base portion 134, circumferentially around cavity 136, with rod 142 (preferably, a cylindrical tube slightly smaller in diameter than tube 132) for structural strength extending through shaft 132 and cavity 136, and coupled to a lifting or pushing device adapted to push its end edge beyond the bottom surface of base portion 134 for disengaging magnetic coupling between the magnets and anchoring structure 130. Such shaft/base 132/134 may, of course, be easily adapted to permit the airship to rotate relative to anchoring structure 130. In addition, the lifting mechanism may be a hydraulically operated mechanism where large forces are needed for disengaging the magnetic coupling.

Alternatively, the anchoring mechanism may include a cluster of magnets positioned around the bearing rod, on a support member rotatably mounted to the airship. In addition, the bearing rod (which may be a cylinder-like structure for structural strength) may be adapted to include an electrically operated cork-screw device for "threading" into the ground to anchor the airship when magnetic anchoring is not possible.

Accordingly, the invention in its broader aspects is not limited to the specific embodiments herein shown and described, but variations may be made therefrom within the scope of the accompanying claims, without departing from the principles of the invention and without sacrificing its principal advantages.

What is claimed is:

1. A magnetic anchoring assembly for anchoring an airship containing lighter-than-air gas, comprising:

a generally hollow support member coupled at one of its ends to a generally downwardly-facing portion of the airship, said support member at its other end providing a cavity portion which opens into the hollow support member, said support member being made of a non-magnetically attractive material and comprising:

a generally hollow shaft portion rotatably attached at said one end to said downwardly-facing portion to permit rotation about its longitudinal axis relative to the airship, and a base portion formed on said shaft portion at its other end, said base portion extending generally perpendicular to said shaft portion and having a substantially larger crosssectional area than said shaft portion, said cavity being formed in said base portion and extending to its bottom surface;

permanent magnet means adapted to be slidably retained within said cavity portion;

positioning means attached to said magnet means for positioning said magnet means at desired locations within said cavity portion, said positioning means being operably coupled to said support member for bearing against said support member when positioning said magnet means within said cavity portion;

a generally elongate tie member slidable within said hollow shaft portion and coupling said magnet means to said positioning means to permit said magnet means to be positioned between a first position where its bottom surface is essentially co-planar with the bottom surface of said base portion and a second position where its bottom surface is spaced above the bottom surface of said base portion; and thrust ball bearing means coupled between said positioning means and said tie member, such that a magnetic surface of said magnet means, formed on the bottom surface of said magnet means, can be moved from said first position generally co-planar with the bottom surface of said base portion for permitting physical contact between said magnetic surface and a magnetically attractive anchoring member secured to the ground to said second position, withdrawn within said cavity, for substantially weakening magnetic attraction between said magnet means and the anchoring member to permit flight of the airship, the airship being capable of rotating generally freely about the longitudinal axis of the hollow shaft portion.

2. An anchoring assembly according to claim 1, wherein said positioning means is mounted to a frame member which is pivotally attached to the airship for pivotal movement about at least one axis and wherein said hollow portion is also coupled to said frame, such that the airship is permitted to rotate vertically at least a relatively small amount to generally minimize the effect of wind gusts acting on the airship, otherwise tending to disengage the magnetic coupling between said magnet and the anchoring member.

3. An anchoring assembly according to claim 2, wherein said frame is coupled to the airship by a flexible but resilient mounting plate adapted to accommodate vertical movements of an end of the airship when anchored.

4. A magnetic anchoring assembly for anchoring an airship containing lighter-than-air gas, the airship having an overall length measured generally along its longitudinal axis, comprising:

a generally hollow support member coupled at one of its end to a generally downwardly-facing portion of the airship, said support member at its other end providing a cavity portion which opens into the hollow support member, said support member being made of a non-magnetically attractive material and comprising:
- a generally hollow shaft portion attached at said one end to said downwardly-facing portion of the airship, and
- a generally round base portion formed on said shaft portion at its said other end, said base portion extending generally perpendicular to said shaft portion and having a diameter measuring from about 1/25 to about 1/40 the overall length of the airship, said cavity being formed in said base portion and extending to its bottom surface;

permanent magnet means adapted to be slidably retained within said cavity portion;

positioning means attached to said magnet means for positioning said magnet means at desired locations within said cavity portion, said positioning means being operably coupled to said support member for bearing against said support member when positioning said magnet means within said cavity portion;

a generally elongate tie member slidable within said hollow shaft portion and coupling said magnet means to said positioning means to permit said magnet means to be positioned between a first position where its bottom surface is essentially co-planar with the bottom surface of said base portion and a second position where its bottom surface is spaced above the bottom surface of said base portion; and roller means mounted to said base portion, said roller means being adapted to extend beyond the plane defined by the bottom surface of the base portion to permit the airship to taxi, yet being retractable when anchoring of the airship is desired, such that a magnetic surface of said magnet means, formed on the bottom surface of said magnet means, can be moved from said first position generally co-planar with the bottom surface of said base portion for permitting physical contact between said magnetic surface and a magnetically attractive anchoring member secured to the ground to said second position, withdrawn within said cavity, for substantially weakening magnetic attraction between said magnet means and the anchoring member to permit flight of the airship.

5. An anchoring assembly according to claim 4, wherein said roller means includes at least one retractable castor-like member secured to said base portion, said castor-like member being generally biased to extend beyond the plane defined by the bottom surface of said base portion.

6. An anchoring assembly according to claim 4, wherein said roller means comprise at least three said castor-like members attached to said base portion.

7. A magnetic anchoring assembly for anchoring an airship containing lighter-than-air gas, the airship having a longitudinal axis, comprising:

a generally hollow support member coupled at one of its ends to the airship, the other end of said support member providing a cavity portion which opens into the hollow support member, said support member including a generally cylinder-like member mounted at one end to the airship with its longitudinal axis extending generally parallel to the longitudinal axis of the airship and having a generally free end edge at its other end;

permanent magnet means adapted to be slidably retained within said cavity portion; and positioning means attached to said magnet means for positioning said magnet means at desired locations within said cavity portion, said positioning means being operably coupled to said support member for bearing against said support member when positioning said magnet means within said cavity portion, such that a magnetic surface of said magnet means can be moved from a first position generally co-planar with the free end edge of said other end of said support member for permitting physical contact between the magnetic surface and a magnetically attractive anchoring structure supported above the ground at a level corresponding to that of the support member when the airship is in its anchoring configuration relative to the ground to a second position inwardly from said end edges for substantially weakening the magnetic attraction between said magnet means and the anchoring structure to permit flight of the airship.

8. An anchoring assembly according to claim 7, wherein said positioning means is attached to the end edges of said one end of said cylinder-like member to bear directly against said cylinder-like member when causing disengagement between said magnet and the anchoring member.

9. An anchoring assembly according to claim 8, wherein the magnetically attractive structure is rotatably supported above the ground.

10. An anchoring assembly according to claim 9, wherein said magnetically attractive structure includes at least one flat surface adapted to make generally surface contact with the free surface of said magnet when anchoring is desired.

11. An anchoring assembly according to claim 10, wherein said magnetically attractive structure is adapted to maintain said at least one flat surface extending essentially perpendicular to the direction of wind flow, such that the longitudinal axis of the airship maintained essentially parallel to the wind flow direction while being positioned for anchoring.

12. An anchoring assembly according to claim 11, wherein said magnetically attractive structure comprises a generally wedge-shaped member rotatably mounted to a mast-like structure affixed to the ground, said wedge-shaped member having a generally triangular configuration in its horizontal cross-section and including two sides attached together along corresponding edges but separated at their other edges by a relatively shorter side, the coupling of said wedge-shaped member to the mast-like structure being closer to the attached corresponding edges than the relatively shorter side.

13. A magnetic anchoring assembly for anchoring an airship containing lighter-than-air gas, which comprises:
   magnet means mounted to a generally downwardly-facing portion of the airship for retaining the airship anchored to a magnetically attractive anchoring member affixed to the ground, said magnet means including permanent magnet means arranged in a generally circular configuration with a generally open portion at the center thereof and with the bottom surface of said permanent magnet means defining a generally common plane; and
   means mounted to a generally downwardly-facing portion of the airship for enabling said magnet means to make magnetic engagement with the magnetically attractive anchoring member by physical contact therewith when anchoring is desired and for bearing against the anchoring member to separate said magnet means from the anchoring member when flight of the airship is desired, said enabling/bearing means including:
      an actuating member movable within said open portion, and
      lifting means coupled between the airship and the top end of the actuating member for positioning the bottom end of the actuating member relative to the bottom surfaces of said magnetic portions,
   such that when magnetic anchoring is desired, the bottom end of said acutating member is positioned so as not to protrude below the bottom surface of said permanent magnet means and when flight of the airship is desired, the bottom end of said actuating member is urged by said lifting means to extend beyond the bottom surfaces of said permanent magnet means to disengage magnetic coupling between said permanent magnet means and the anchoring member by bearing against the anchoring member.

14. An anchoring assembly according to claim 13, which further includes propulsion means mounted to the airship, said propulsion means comprising a single motor means adapted to operate at least two propulsion devices, said propulsion devices adapted to provide thrust in a range of directions of at least about 90° and said propulsion means being mounted on said airship for longitudinal movement, fore and aft of the airship, for permitting a change in the position at which propulsive thrust is applied to the airship.

15. An anchoring assembling according to claim 14, wherein said propulsion devices are also adapted to reverse the direction of thrust provided thereby.

16. An anchoring structure according to claim 15, wherein said propulsion devices are adapted to rotate through about 180°.

17. An anchoring assembly to claim 13, wherein said magnet portions are mounted to the airship for enabling rotation of the airship generally about the axis of said actuating member.

18. An anchoring assembly according to claim 13, which further includes auxiliary anchoring means comprising a cork screw-like member adapted to be threaded into the ground.

19. An anchoring assembly according to claim 18, wherein said auxiliary anchoring means is mounted to bottom of said acutating member.

20. Propulsion means for an airship containing lighter-than-air gas, which comprise:
   a generally hollow shaft mounted to the airship, the free ends of the hollow shaft extending generally outwardly from the airship;
   a drive shaft rotatably mounted within said hollow shaft;
   drive means coupled to said drive shaft for rotating said drive shaft;
   a propeller assembly operably coupled to each outward end of said drive shaft at the free ends of said hollow shaft, said propeller assemblies being adapted to rotate through at least about 180° and having propeller blades adapted for reversing the pitch thereof, each said propeller assembly including:
      a first frame rotatably mounted to each outward end of said hollow shaft, said frame having first gear means operably coupled to motor means which is mounted to said hollow shaft for rotating said frame relative to said hollow shaft,
      a second shaft rotatably mounted in said frame, one end of said second shaft operably coupled by second gear means to an end of said drive shaft and the other end adapted to be fixedly attached to said propeller blades,
      a second frame fixedly secured to the other end of each said second shaft, said propeller blades being pivotally mounted to said second frame for pivoting about an axis longitudinal of said blades to permit variations in the pitch of said blades, and
      variable pitch means mounted to said first frame and operably coupled to said propeller blades for varying the pitch of said blades,
   said propulsion means being mounted to the airship for translating generally longitudinally of the airship for permitting a change in the position at which propelling thrust is applied to the airship, and said drive means operating both of said propeller assemblies for providing thrust in desired directions.

21. Propulsion means according to claim 20, wherein said drive motor, drive shaft and propeller assembly are mounted to a first support frame, said first support frame being movably attached to a second support frame mounted to the airship and including means for moving said first support frame relative to said second support frame.

22. A magnetic anchoring assembly for anchoring an airship containing lighter-than-air gas, comprising:
   a generally hollow non-magnetically attractive support member rotatably mounted by one of its ends to a generally downwardly facing surface of the airship, said support member including:
      a first portion having its said one end mounted to the airship and having a passage extending from its said one end to its other end, and
      a base portion at the other end of said first portion, said base portion defining a cavity which is in communication with the passage of said first portion;
   permanent magnet means adapted to be slidably retained within said cavity;
   positioning means coupled to said magnet means for positioning said magnet means within said cavity, said positioning means being coupled to said support member for bearing thereagainst when positioning said magnet means within said cavity, and said positioning means including a generally elongate tie member slidable within said passage and affixed to said magnet means for moving said magnet means from a first position where a surface of said magnet means is essentially co-planar with the bottom surface of said base portion to a second position where the magnet surface is withdrawn from the bottom surface of the base portion; and thrust ball bearing means coupled between said positioning means said tie member;

such that when anchoring of said airship is desired, the surface of said magnet means can be moved to said first position where it will have its strongest magnetic attraction to the anchoring member and the airship can rotate essentially freely about the anchoring point, and when ascent of the airship is desired, said positioning means can be activated to withdraw said magnet means within said cavity, said support means bearing against the anchoring member to permit withdrawal, to substantially reduce the magnetic attraction between the magnet means and the anchoring member.

23. An anchoring assembly according to claim 22, wherein said positioning means is mounted to a frame member which is pivotally attached to the airship for pivotal movement about at least one axis and wherein said first position is also coupled to said frame, such that the airship is permitted to rotate vertically at least a relatively small amount to generally minimize the effect of wind gusts acting on the airship, otherwise tending to disengage the magnetic coupling between said magnet and the anchoring member.

24. An anchoring assembly according to claim 23, wherein said frame is coupled to the airship by a flexible but resilient mounting plate adapted to accommodate vertical movements of an end of the airship when anchored.

* * * * *